(12) United States Patent
Cao

(10) Patent No.: US 10,804,977 B2
(45) Date of Patent: Oct. 13, 2020

(54) ELECTRONIC DEVICE AND COMMUNICATION METHOD

(71) Applicant: Sony Corporation, Tokyo (JP)

(72) Inventor: Jianfei Cao, Beijing (CN)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/323,660

(22) PCT Filed: Oct. 20, 2017

(86) PCT No.: PCT/CN2017/106996
§ 371 (c)(1),
(2) Date: Feb. 6, 2019

(87) PCT Pub. No.: WO2018/095168
PCT Pub. Date: May 31, 2018

(65) Prior Publication Data
US 2019/0207657 A1 Jul. 4, 2019

(30) Foreign Application Priority Data
Nov. 25, 2016 (CN) .......................... 2016 1 1054719

(51) Int. Cl.
H04B 7/0417 (2017.01)
H04B 7/06 (2006.01)
H04B 7/0456 (2017.01)
H04W 72/12 (2009.01)
H04W 72/04 (2009.01)
(Continued)

(52) U.S. Cl.
CPC ............ H04B 7/0417 (2013.01); H04B 7/04 (2013.01); H04B 7/0456 (2013.01); H04B 7/06 (2013.01);
(Continued)

(58) Field of Classification Search
CPC ...... H04B 7/04; H04B 7/0417; H04B 7/0452; H04B 7/045; H04B 7/06; H04B 7/0602;
(Continued)

(56) References Cited

U.S. PATENT DOCUMENTS 8,571,086 B2   10/2013  Forenza et al.
8,750,205 B2   6/2014   Chen et al.
(Continued)

FOREIGN PATENT DOCUMENTS

CN   102823152 A   12/2012
CN   103312401 A   9/2013
CN   105591677 A   5/2016

OTHER PUBLICATIONS

International Search Report dated Dec. 28, 2017 for PCT/CN2017/106996 filed on Oct. 20, 2017, 9 pages including English translation.

Primary Examiner — Gary Mui
(74) Attorney, Agent, or Firm — Xsensus LLP

(57) ABSTRACT

The present disclosure relates to an electronic device and communication method. The electronic device used in a first terminal device side of a wireless communication system including: a memory for storing computer instructions; and a processing circuit configured to perform the computer instructions stored thereon for: measuring a first reference signal subject to a first precoding from a base station, wherein a first precoding matrix for the first precoding is determined by the base station based on respective channel states fed back from a plurality of candidate terminal devices, wherein the first terminal device is included in the plurality of candidate terminal devices; determining an interference of other terminal devices in the plurality of candidate terminal devices to the first terminal device based on a result of the measuring and information about the first precoding; and feeding back information indicating the interference to the base station.

18 Claims, 12 Drawing Sheets

(51) Int. Cl.
    *H04W 72/08* (2009.01)
    *H04B 7/04* (2017.01)
(52) U.S. Cl.
    CPC .......... *H04B 7/0602* (2013.01); *H04W 72/04* (2013.01); *H04W 72/082* (2013.01); *H04W 72/1205* (2013.01)
(58) Field of Classification Search
    CPC ..... H04B 7/063; H04L 5/0048; H04L 5/0062; H04W 72/04; H04W 72/082; H04W 72/1205; H04W 72/1221; H04W 72/1231
    See application file for complete search history.

(56) References Cited

U.S. PATENT DOCUMENTS

| | | |
|---|---|---|
| 2010/0316163 A1 | 12/2010 | Forenza et al. |
| 2011/0032839 A1 | 2/2011 | Chen et al. |
| 2011/0200081 A1* | 8/2011 | Guo ..................... H04B 7/0417 375/224 |
| 2012/0213169 A1* | 8/2012 | Wang ....................... H04B 7/04 370/329 |
| 2012/0328035 A1 | 12/2012 | Yoon et al. |
| 2013/0242921 A1* | 9/2013 | Kim ..................... H04B 7/024 370/329 |
| 2013/0308488 A1* | 11/2013 | Tong .................... H04B 7/0452 370/252 |
| 2014/0112312 A1* | 4/2014 | Kim ..................... H04L 5/0023 370/335 |
| 2014/0133334 A1* | 5/2014 | Nagata ................. H04B 7/0452 370/252 |
| 2015/0256242 A1* | 9/2015 | Morita ............. H04L 25/03942 375/267 |
| 2016/0182135 A1* | 6/2016 | Onodera ............. H04B 7/0452 375/267 |
| 2016/0233938 A1* | 8/2016 | Mondal ................ H04B 17/345 |
| 2017/0012753 A1* | 1/2017 | Kim ..................... H04L 5/0048 |

* cited by examiner

ELECTRONIC DEVICE AND COMMUNICATION METHOD

CROSS-REFERENCE TO RELATED APPLICATIONS

The present application is based on PCT filing PCT/CN2017/106996 filed Oct. 20, 2017 and claims the benefit of priority to the Chinese patent application No. 201611054719.9 filed on Nov. 25, 2016, which is hereby incorporated by reference in its entirety as a part of the present application.

TECHNICAL FIELD

This disclosure relates to an electronic device and a communication method, and more particularly to an electronic device and a communication method in a Multi-User Multi-Input Multi-Output (MU-MIMO) system.

BACKGROUND in a LTE (Long Term Evolution) system of 3GPP (3rd Generation Partnership Project) MU-MIMO technology can be used for increasing a system capacity of the LTE system, so as to meet increasingly growing traffic demands.

In a MU-MIMO scheduling process, time-frequency resources of different antennas are allocated to a plurality of user equipments (UEs) (also referred to as terminal devices), such that the plurality of UEs can share time-frequency resources in space, thereby increasing a number of UEs that can be scheduled on the same time-frequency resources, so as to improve the overall scheduling efficiency.

In order to realize MU-MIMO scheduling, the base station is required to collect, from the plurality of UEs, channel quality information (CQI) that is obtained by, each UE measuring and calculating a reference signal of the present cell and reference signals of neighboring cells, and based on the collected CQI, simulate and calculate signal and interference to noise ratios when different combinations of users perform the MU-MIMO transmission by using for example, a link adaptive technology, to determine which UEs are to be used for performing actual MU-MIMO transmission and/or which modulation and coding scheme (MCS) is to be applied to each UE.

As mentioned above, in the prior art, CQI is an index reflecting a UE channel quality in a single-user MIMO (SU-MIMO) state; in other words, the prior art at present only supports the CQI in the case of scheduling a single UE in one cell, instead of the CQI in the case of scheduling a plurality of UEs. Therefore, the CQI respectively collected by the base station from each UE cannot reflect an interference caused by other UEs to the present UE in the real MU-MIMO state, so that the base station cannot learn an actual channel state in the MU-MIMO state. Accordingly, in the existing MU-MIMO system, it is difficult for the base station to carry out accurate MU-MIMO scheduling.

SUMMARY

A brief overview of this disclosure is given below in order to provide a basic understanding of some aspects of this disclosure. It should be understood, however, that this overview is not an exhaustive overview of this disclosure. It is not intended to determine critical parts or important parts of this disclosure, nor is it intended to limit the scope of this disclosure. This disclosure is only intended to give some concepts of this disclosure in a simplified form as a prelude to a more detailed description given later.

According to an aspect of this disclosure, an electronic device used in a first terminal device side of a wireless communication system is provided. The electronic device may include: a memory for storing computer instructions; and a processing circuit configured to perform the computer instructions stored thereon for: measuring a first reference signal subject to a first precoding from a base station, wherein a first precoding matrix for the first precoding is determined by the base station based on respective channel states fed back from a plurality of candidate terminal devices, wherein the first terminal device is included in the plurality of candidate terminal devices; determining an interference of other terminal devices in the plurality of candidate terminal devices to the first terminal device based on a result of the measuring and information about the first precoding; and feeding back information indicating the interference to the base station.

According to another aspect of this disclosure, an electronic device used in a base station side of a wireless communication system is provided. The electronic device may include: a memory for storing computer instructions; and a processing circuit configured to perform the computer instructions stored thereon for: determining a first precoding matrix for a plurality of candidate terminal devices based on respective channel states fed back from the plurality of candidate terminal device; performing a first precoding for a first reference signal with the first precoding matrix; sending the first reference signal subject to the first precoding to the plurality of candidate terminal devices; and scheduling the plurality of candidate terminal devices based on information fed back by each of the plurality of candidate terminal devices according to a result of measuring the received first reference signal subject to the first precoding and information about the first precoding, wherein information fed back by each of the terminal devices indicates an interference of other terminal devices in the plurality of candidate terminal devices to the terminal device.

According to a still another aspect of this disclosure, a communication method for a wireless communication system is provided. The method may include: a first terminal device measures a first reference signal subject to a first precoding from a base station, wherein a first precoding matrix for the first precoding is determined by the base station based on respective channel states fed back from a plurality of candidate terminal devices, wherein the first terminal device is included in the plurality of candidate terminal devices; the first terminal device determines an interference of other terminal devices in the plurality of candidate terminal devices to the first terminal device based on a result of the measuring and information about the first precoding; and the first terminal device feeds back information indicating the interference to the base station.

According to a further aspect of this disclosure, a communication method for a wireless communication system is provided. The method may include: a base station determines a first precoding matrix for a plurality of candidate terminal devices based on respective channel states fed back from the plurality of candidate terminal device; the base station performs a first precoding for a first reference signal with the first precoding matrix; the base station sends the first reference signal subject to the first precoding to the plurality of terminal devices; and the base station schedules the plurality of candidate terminal devices based on information fed back by each of the plurality of terminal devices according to a result of measuring the received first reference signal subject to the first precoding and information about the first precoding, wherein information fed back by each of the terminal devices indicates an interference of other terminal devices in the plurality of candidate terminal devices to the terminal device.

According to a still further aspect of this disclosure, a computer-readable storage medium is provided, including executable instructions, which, when executed by an information processing device, cause the information processing device to perform a communication method according to this disclosure.

According to one or more embodiments of this disclosure, it is possible to obtain information that more accurately reflects the interference between a plurality of terminal devices in a cell, which helps in more accurate MU-MIMO scheduling.

BRIEF DESCRIPTION OF THE DRAWINGS

The accompanying drawings constituting a part of the specification describe embodiments of this disclosure and, together with the description, are used for explaining the principles of this disclosure.

This disclosure can be more clearly understood with reference to the accompanying drawings in conjunction with the detailed description below, wherein:

FIGS. 10A-10B are schematic diagrams showing occupancies of reference signals on resource blocks according to another embodiment of this disclosure;

DETAILED DESCRIPTION

Figure 1:
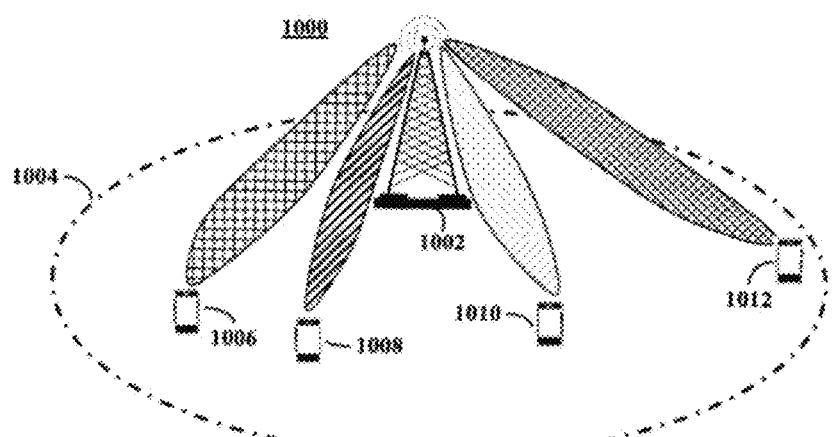
FIG. 1 is a schematic diagram showing a MU-MIMO system.

Various illustrative embodiments of this disclosure are now described in detail with reference to the accompanying drawings. It should be noted that, unless otherwise specified, relative arrangement, numerical expressions and values of the parts and steps described in these embodiments do not limit the scope of this disclosure.

Meanwhile, it should be appreciated that, for ease of description, the dimensions of the parts shown in the drawings are not drawn to their actual ratios.

The following description of at least one illustrative embodiment is in fact merely illustrative and in no way serves as any limitation to this disclosure and its applications or uses.

The technologies, methods and devices known to ordinary technicians in the relevant fields may not be discussed in detail, but where appropriate, the techniques, methods and devices should be considered as a part of the specification.

In all the examples shown and discussed herein, any specific value should be interpreted as merely illustrative, instead of restrictive. Therefore, other examples of the illustrative embodiments can have different values.

It should be noted that similar reference numerals and letters represent similar items in the following accompanying drawings, so once an item is defined in a drawing, it does not need to be further discussed in subsequent drawings.

To facilitate a better understanding of the technical solutions according to this disclosure, the following is a brief introduction of some of the concepts used in this disclosure.

A base station such as an evolutionary Node B (eNB) has a plurality of antennas that support the MIMO technology. The use of the MIMO technology enables the base station to use the space domain to support spatial multiplexing, beamforming and transmit diversity. The spatial multiplexing can be used for transmitting different data streams simultaneously at the same frequency. These data streams can be transmitted to a single UE to increase data rate (which can be classified as SU-MIMO technology) or to a plurality of UEs to increase the total system capacity (which can be classified as MU-MIMO technology). This is achieved by performing spatial precoding (i.e., applying amplitude scaling and phase adjustment) on each data stream and subsequently transmitting each spatially precoded stream on the downlink (DL) through a plurality of transmitting antennas. The spatial precoded data streams arrive at the UE(s) with different spatial signatures, which enables each UE in the UE(s) to recover one or more data streams destined for that UE. On the uplink (UL), each UE transmits the spatially precoded data stream, which enables the base station to identify a source of each spatially precoded data stream.

The spatial multiplexing is generally used in a good channel condition. When the channel condition is less favorable, beamforming can be used to focus the emitted energy in one or more directions. This can be achieved by spatially precoding the data for transmission through a plurality of antennas. In order to achieve good coverage at an edge of a cellular cell, single-stream beamforming transmission can be used in conjunction with transmit diversity.

In the following detailed description, various aspects of the access network will be described with reference to the MIMO system that supports orthogonal frequency division multiplexing (OFDM) on the OFDM is a spread spectrum technique that modulates data onto several sub-carriers within an OFDM symbol. These sub-carriers are separated from one another at precise frequencies. This separation provides "orthogonality" that enables the receiver to recover data from these sub-carriers. In the time domain, a guard interval (for example, a cyclic prefix) can be added to each OFDM symbol to counter the interference between the OFDM symbols. UL can compensate for a high peak average power ratio (PAPR) using single-carrier frequency division multiple access (SC-FDMA) in the form of OFDM signals extended by discrete Fourier transform (DFT).

Next, a radio protocol architecture used for a user plane and a control plane in the LTE is explained. The radio protocol architecture for UE and eNB is shown to have three layers: Layer 1, Layer 2, and Layer 3. Layer 1 (L1 layer) is the lowest layer for implementing various physical layer signal processing functions. The L1 layer will be called physical layer in this disclosure. Layer 2 (L2 layer) is above the physical layer and is responsible for a link above the physical layer between the UE and the eNB.

In the user plane, the L2 layer includes a media access control (MAC) sub-layer, a radio link control (RLC) sub-layer, and a packet data convergence protocol (PDCP) sub-layer, which are terminated at the eNB on the network side. The UE can also have several upper layers above the L2 layer, including a network layer (for example, the IP layer) terminated at a PDN gateway on the network side, and an application layer terminated at the other end (for example, distal UE, server, and etc.) of the connection.

The PDCP sub-layer provides different radio carriers and multiplexing between logical channels. The PDCP sub-layer further provides header compression of upper data packets to reduce radio transmission overhead, provides security by encrypting the data packets, and provides support for switching of the UE between the various eNBs. The RLC sub-layer provides segmentation and reloading of the upper data packets, retransmission of lost data packets, and reordering of the data packets to compensate for disorder reception caused by hybrid automatic retransmission request (HARQ). The MAC sub-layer provides multiplexing between the logical channel and the transmission channel. The MAC sub-layer is also responsible for allocating various radio resources (for example, resource blocks) in a cellular cell between the various UEs. The MAC sub-layer is also responsible for HARQ operations.

In the control plane, the radio protocol architecture for the UE and the eNB is substantially the same for the physical layer and the L2 layer, except that there is no compression function for header in the control plane. The control plane also includes a radio resource control (RRC) sub-layer in the Layer 3 (L3 layer). The RRC sub-layer is responsible for obtaining the radio resources (i.e., radio carriers) and for using RRC signaling between the eNB and the UE to configure respective lower layers.

The various signal processing functions of the L1 layer (i.e., the physical layer) implemented on the base station side are briefly introduced below. These signal processing functions include encoding and interleaving to facilitate forward error correction (FEC) of the UE, and mapping made to signal constellations based on various modulation schemes (for example, binary phase shift keying (BPSK), orthogonal phase shift keying (QPSK), M phase shift keying (M-PSK), M orthogonal amplitude modulation (M-QAM)). Subsequently, the encoded and modulated symbols are split into parallel streams. Each stream is then mapped to the OFDM sub-carrier, multiplexed in the time domain and/or frequency domain with the reference signal (for example, pilot), and then combined together using a fast Fourier inverse transform (LIFT) to produce a physical channel that carries the time domain OFDM symbol streams. The OFDM stream is precoded in space to produce multiple spatial streams. Channel estimation can be used for determining a coding and modulation scheme as well as for spatial processing. The channel estimation can be derived from the reference signal and/or channel condition feedback transmitted by the UE. Each space stream is then provided to different antennas via separate transmitters. Each transmitter uses its own space stream to modulate the RF carrier for transmission.

At the UE, each receiver receives a signal through its own respective antenna. Each receiver recovers the information modulated to the radio frequency (RF) carrier and provides that information to the various signal processing functions of the L1 layer. Spatial processing is performed on the information on the L1 layer to recover any space stream destined for the UE. If there are multiple space streams destined for the UE, they can be combined into a single OFDM symbol stream. The OFDM symbol stream is then converted from the time domain to the frequency domain using fast Fourier transform (ITT). The frequency domain signal comprises a separate OFDM symbol stream for each sub-carrier of the OFDM signal. The symbols on each sub-carrier, as well as the reference signal are recovered and demodulated, by determining signal constellation points that are most likely to be transmitted by eNB. These soft decisions can be based on channel estimation. These soft decisions are then decoded and de-interleaved to recover the data and control signals that were originally transmitted by eNB on the physical channel. These data and control signals are then provided to higher layers to be processed.

Some terms related to downlink reference signal and channel state information are discussed below.

Downlink Reference Signal

Downlink reference signal is a predefined signal that occupies a specific resource element (RE) in the downlink time frequency resource block (RB). In the LTE downlink, the following different types of reference signals are comprised:

Cell-specific reference signal (CRS): usually referring to a common reference signal, which can be used by all UEs in the cell.

Demodulation reference signal (DMRS): embedded in the data for specialized users.

Channel state information reference signal (CSI-RS): for estimating channel state information, so as to assist resource scheduling and precoding of the base station.

Channel Stale Information (CSI)

Channel state information is used to indicate a channel state of a channel between the base station and the UE. The channel state information can include a rank indicator (RI), a precoding matrix indicator (PMI), and a channel quality indicator (CQI).

RI is information about channel rank, and the channel rank indicates a maximum number of layers that can carry different information in the same time-frequency resource.

PMI is used to indicate an index of a specific precoding matrix in a code book that includes multiple precoding matrices and that is shared between the base station and the UE.

CQI indicates channel quality and can be used to help determining the corresponding modulation scheme and encoding rate.

In addition, CRI (CSI-RS resource indicator) is used to indicate preferred CSI-RS resources, and UE measures each CSI-RS resource and feeds back recommended beams in the form of CRI.

Next, a full-dimensional MIMO (FD-MIMO) technology is briefly introduced.

FD-MIMO technology can greatly improve the system capacity by using a two-dimensional antenna array with, for example, up to 64 antenna ports at eNB. The benefits of using multiple antenna ports at eNB can include a small interference between cellular cells and a high beamforming gain. The use of the two-dimensional antenna array allows for the beamforming depending on. UE in both horizontal and vertical directions.

In the FD-MIMO system, as compared with a traditional 8-antenna MIMO system, the number of transmitting antennas at the eNB can be increased, for example, by 8 to 10 times. These additional transmitting antennas can bring a higher beamforming gain and introduce less interference into neighboring cellular cells.

In the traditional MIMO technology with a one-dimensional antenna array, the beamforming depending on the UE can be performed only in the horizontal direction. The common vertical downward inclination angle can be applied to multiple UEs.

In the FD-MIMO technology with the two-dimensional antenna array, the beamforming depending on the UE can be performed in both horizontal and vertical directions.

In a traditional linear precoding, eNB requires MIMO channel state information (CSI) about the full channel. For example, traditional beamforming/precoding methods rely on the availability of CSI in the entire transmit dimension (for example, instantaneous/statistical knowledge of the channel from each eNB transmitting antenna to one or more UE receiving antennas is required).

This CSI is obtained either by UE's PMI/RI feedback or by taking advantage of channel reciprocity. In a TDD (time division duplex) system, the CSI is obtained mainly by using bidirectional channel reciprocity at eNB. In a FDD (frequency division duplex) system, the CSI is usually measured and quantified at the UE and then fed back to the eNB via a dedicated uplink channel. In general, the size of the codebook used for CSI quantification increases as the number of transmitting antennas at the eNB increases.

UE's PMI/RI report can be based on pilot auxiliary estimation of the DL full channel. The pilot (or common reference signal) overhead and the complexity of the DL channel estimation can be proportional to the number of eNB antennas. As a result, the complexity of selecting the PMI/RI can increase as the number of eNB antennas increases.

As mentioned above, the traditional channel estimation and channel information feedback are problematic due to the increase in the number of the transmitting antennas. Therefore, in some known technical discussions, the following two-level channel information feedback method is proposed: the eNB first utilizes preset multiple CSI-RS resources to emit multiple CSI-RS beams shared by the cell for UE measurement, and then obtains from the UE a long-term/rough CSI measured thereby, and then compresses a larger number of antennas into a smaller number of antenna ports according to the long-term/rough CSI. The UE measures a short-term CSI on a smaller number of antenna ports rather than on the larger number of antennas.

The UE can quantify the short-term CSI and feed it back to the eNB. The eNB can use the quantified short-term CSI to map multiple data layers to a UE-dependent antenna port (for example, using a layer precoder), thereby reducing the complexity of channel estimation and CSI feedback overhead. The following is a brief introduction to the MU-MIMO system in combination with FIG. 1. As shown in FIG. 1, the MU-MIMO system 1000 includes a base station 1002 and a plurality of terminal devices 1006, 1008, 1010, and 1012. The base station 1002 and the plurality of terminal devices 1006, 1008, 1010 and 1012 are located in a cell 1004.

It should be understood that, the base station described in the description of this disclosure can be implemented as any type of eNB or other types of base station, etc. (see "Application examples for the base station" later); the terminal device described in the description of this disclosure can be implemented as a mobile terminal or vehicle-mounted terminal, etc. (see "Application examples for the terminal device" later), and the terminal device is sometimes referred to as UE in the following.

As mentioned above, in the MU-MIMO 40 system 1000, the base station 1002 can schedule a plurality of terminal devices simultaneously on the same time-frequency resource block (RB), to realize the space division multiplexing of modulation symbol streams of the plurality of terminal devices on the same tune-frequency resources. For example, as shown in FIG. 1, the terminal devices 1006, 1008, 1010, and 1012 can be collectively scheduled on the same tune-frequency resource and in different spaces (as shown by four "beams" in FIG. 1). In addition, since the terminal devices 1006, 1008, 1010 occupy the same time-frequency resources, and they are relatively close to each other in space or the channels between the terminal devices and the base station have a higher correlation, interference will occur between each other in the process of data transmission.

In the MU-MIMO data transmission, the base station 1002 calculates a precoding matrix based on the channel state of each terminal device (such as terminal devices 1006, 1008, 1010 and 1012) participating in the multi-user transmission and transmits data signals using a corresponding beamforming scheme, such that different terminal devices correspond to different spatial beams, as shown in FIG. 1. However, in the traditional MU-MIMO system, the base station calculates the MU-CQIs under multiple MU-MIMO user combinations based on the CSIs (including CQIs and PMIs) reported by the respective currently servicing users to determine its selection of MU-MIMO users and/or transmission coding schemes of various users, thus, there lacks a mechanism to support channel state measurement consistent with the actual MU-MIMO data transmission.

A signaling diagram of MU-MIMO scheduling in the prior art is described in the following with reference to FIG. 2.

Figure 2:
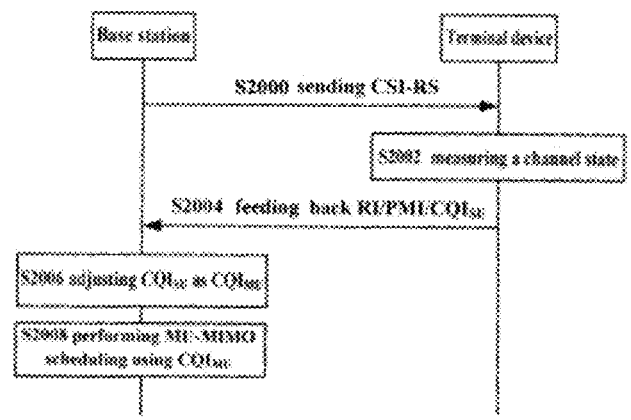
FIG. 2 is a signaling diagram showing MU-MIMO scheduling in the prior art.

The base station shown in FIG. 2 can correspond to the base station 1002 shown in FIG. 1, and the terminal device shown in FIG. 2 can correspond to any of the terminal devices 1006, 1008, 1010 and 1012 shown in FIG. 2.

As shown in FIG. 2, in a step S2000, the base station sends CSI-RS to the terminal device to estimate a downlink channel state.

In a step S2002, the terminal device measures the received CSI-RS to determine the channel state. The obtained channel state information (CSI) can include RI, PMI, and CQI. In the existing LTE system, when calculating the CQI, it is supposed that only one terminal device is scheduled on the same time-frequency resource in the cell, so the CQI only indicates the channel quality (i.e., $CQI_{SU}$) in the case of scheduling a single terminal device in the cell, but cannot reflect the interference of other terminal devices in the same cell to the terminal device.

In a step S2004, the terminal device feeds back to the base station the channel state information, including RI, PMI, and $CQI_{SU}$.

In order to perform the MU-MIMO scheduling, in a step S2006, the base station adjusts the $CQI_{SU}$ to a multi-user CQI, i.e., $CQI_{MU}$, that is related to the interference of other terminal devices in the cell. For example, the base station can adjust the received $CQI_{SU}$ to $CQI_{MU}$ according to the link adaptive technology, etc.

In a step S2008, the base station utilizes the $CQI_{MU}$ to perform MU-MIMO scheduling on the plurality of terminal devices in the cell.

However, the technology that adjusts $CQI_{SU}$ to $CQI_{MU}$ in the prior art has a problem of inaccurate adjustment, which possibly will affect the performance of the MU-MIMO scheduling.

The present invention proposes a method which can obtain information that more accurately reflects the interference between a plurality of terminal devices in a cell, and is helpful for more accurate MU-MIMO scheduling.

A signaling diagram showing the MU-MIMO scheduling according to m embodiment of this disclosure is described in the following with reference to FIG. 3.

Figure 3:
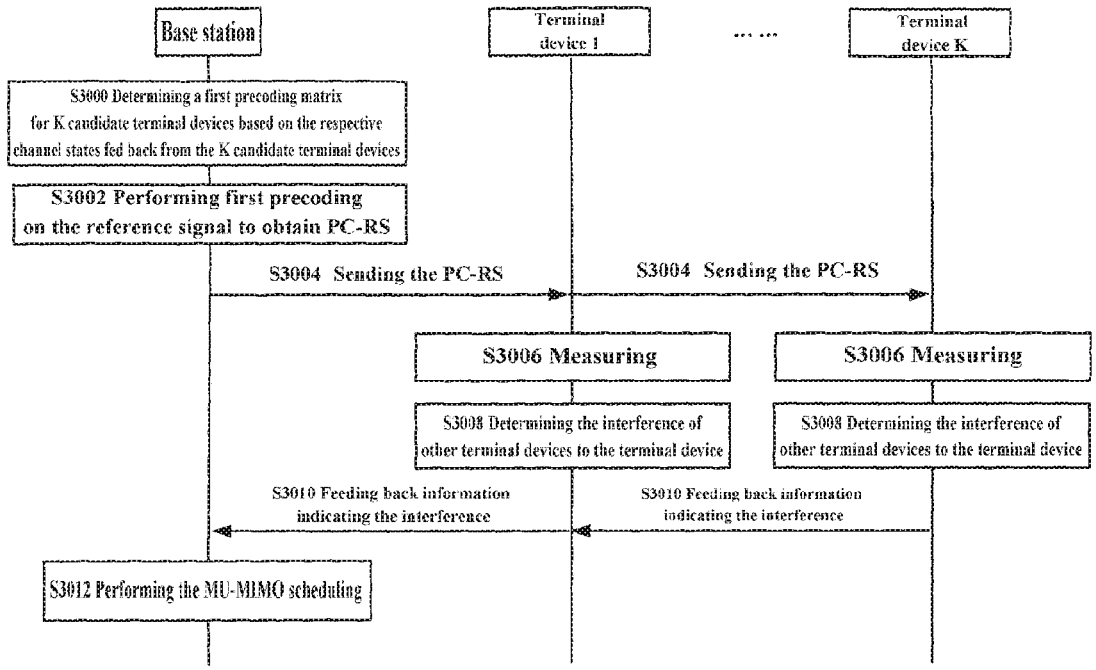
FIG. 3 is a signaling diagram showing MU-MIMO scheduling according to an embodiment of this disclosure.

The MU-MIMO scheduling shown in FIG. 3 for example cm be applied to the MU-MIMO system 1000 shown in FIG. 1. In addition, the base station shown in FIG. 3 can correspond to the base station 1002 shown in FIG. 1, and the K candidate terminal devices (terminal device 1, . . . , terminal device K, where k is a natural number) shown in FIG. 3 can correspond to one or more, or even more of the terminal devices 1006, 1008, 1010 and 1012 shown in FIG. 1.

In an embodiment, the base station selects candidate terminal devices to be MU-MIMO scheduled according to a situation of active terminal devices in the cell. Specifically, in a example, the base station selects K destination terminal devices from among the active terminal devices in the cell as candidate terminal devices, according to a destination terminal device of the downlink data to be transmitted in the downlink transmission buffer. In mother example, the base station determines terminal devices with a smaller channel correlation therebetween as candidate terminal devices, based on the channel state, e.g., PMI or CRI, fed back by the active terminal devices in the cell. Specifically, the base station receives the CRIs fed back by a plurality of active terminal devices respectively, to preliminarily judge which terminal devices are suitable as a user combination of MU-MIMO, and which are not suitable. For example, if the CRIs reported by two terminal devices are the same or indicate beams relatively close in space, it can be roughly considered that the two terminal devices have poor spatial isolation and are not suitable as the user combination of MU-MIMO; otherwise, the two terminal devices are considered suitable as the user combination of MU-MIMO. This process can effectively eliminate many unsuitable MU-MIMO user combinations, thereby reducing the complexity of selection of the candidate terminal device and lightening the burden of multi-user interference measurement.

Suppose that the base station selects K terminal devices as the candidate terminal devices for MU-MIMO scheduling according to the situation of the active terminal devices in the cell. In a step S3000, the base station determines a first precoding matrix for beamforming of the K candidate terminal devices based on the respective channel states fed back from the K candidate terminal devices. The first precoding matrix is the same as the precoding matrix for the data adopted in case where it is supposed that the K candidate terminal devices are finally selected for MU-MIMO transmission.

In an embodiment, the first precoding matrix performs partial-dimensional (such as vertical-dimensional or horizontal-dimensional) beamforming for the K candidate terminal devices. In another embodiment, the first precoding matrix performs a full-dimensional beamforming for the K candidate terminal devices.

According to one embodiment, feeding back the respective channel states from the K candidate terminal devices can be achieved using the prior art shown in FIG. 2, as shown in steps S2000, S2002, and S2004 in FIG. 2. Thus, the channel state fed back from each candidate terminal device includes RI, PMI, and $CQI_{SU}$.

In a step S3002, the base station uses the first precoding matrix to perform first precoding on the reference signal for measuring the interference between the terminal devices, to obtain a first precoded reference signal (Precoded-RS, briefly referred to as PC-RS).

In an embodiment, the reference signal for measuring the interference between the terminal devices can be a specific reference signal. In mother embodiment, the reference signal for measuring the interference between the terminal devices can be implemented using the existing CSI-RS (for example, class B CSI in the current standard), and the base station uses the first precoding matrix to perform first precoding on the CSI-RS to obtain the first precoded CSI-RS (Precoded-CSI-RS, briefly referred to as PC-CSI-RS). In an embodiment, the base station can notify the K candidate terminal devices whether the PC-CSI-RS is used for measuring the interference between terminal devices or for obtaining the traditional CSI. The traditional CSI for example cam include RI, PMI, and CQI, which can be obtained by methods of measuring CSI-RS in the prior art.

In a step S3004, the base station sends PC-RS to the K candidate terminal devices respectively.

In embodiment, in case where the CSI-RS acts a the reference signal for measuring the interference between the terminal devices, the PC-RS sent by the base station to the K candidate terminal devices can be PC-CSI-RS.

In a step S3006, the K candidate terminal devices measure the PC-RS respectively. Since the PC-RS is subjected to the first precoding for beamforming before the transmission, the channel state reflected by its measuring result is closer to the channel state when the MU-MIMO data transmission is actually performed. Specifically, the result of measuring the PC-RS by each terminal device contains interference from other terminal devices.

In a step S3008, each of the K candidate terminal devices determines the interference of other K−1 terminal devices to it based on the received measuring results of the PC-RS.

In a step S3010, the K candidate terminal devices respectively feedback their respective information indicating the interference to the base station.

In a step S3012, the base station performs the MU-MIMO scheduling according to the information indicating the interference fed back from the K candidate terminal devices. For ease of understanding, the process from steps S3002 to S3008 can be illustratively described mathematically.

For example, suppose that the base station side is equipped with $n_t$ transmitting antennas, then the first precoding matrix can be represented as a $n_t \times K$-dimensional matrix $V=[v_1, \ldots, v_i, \ldots, v_K]$, where $v_i$ is a $n_t \times 1$ vector, $1 \le i \le K$. The reference signal in the step S3002 is set a signal s, then the first precoded reference signal PC-RS may be represented as $V_s$.

Suppose that each of the K candidate terminal devices is equipped with one receiving antenna, then a channel from the base station to the terminal device i can be represented as a $1 \times n_t$ vector $H_i$, where $1 \le i \le K$. In a step S3006, the received signal at the terminal device i can be represented as $$y_i^T = H_i V s + n_i \quad \text{[Formula 1]}$$

where $n_i$ represents the received noise at the terminal device i, and is a $1 \times K$ vector; $y_i^T$ represents a transpose of $y_i$, and is a $1 \times K$ vector. The received signal $y_i^T$ represents a result of measuring the PC-RS by the terminal device i.

$H_i V = [H_i v_1, \ldots, H_i v_i, \ldots, H_i v_k]$ in [Formula 1] contains the channel of the terminal device i and interference channels of the rest K−1 terminal devices to the terminal device i. Here, the $H_i V$ is represented as a equivalent channel $H_{\textit{effi}} = H_i V$ of the terminal device i, then $H_{\textit{effi}}$ is a $1 \times K$ vector. Then, [Formula 1] can be rewritten as:

$$y_i = H_{\textit{effi}}^T s + n_i^T \quad \text{[Formula 2]}$$

The terminal device i can utilize [Formula 2] to estimate the equivalent channel $H_{\textit{effi}} = H_i V$. The equivalent channel $H_{\textit{effi}}$ can be estimated by various estimation methods (such as the least square method), which is not limited by the invention.

In the estimated equivalent channel $H_{\textit{effi}}$, the value in the ith column, i.e., $H_i v_i$, indicates the equivalent channel of the terminal device i, and the values in the K−1 columns other than the ith column respectively indicate the equivalent interference channels of the other K−1 terminal devices among the K candidate terminal devices to the terminal device i. Thus, in the step 3008, the interference of the other K−1 terminal devices to the terminal device i can be determined.

Through the above processing, the terminal device i can determine the information indicating the interference according to the estimated equivalent channel $H_{\textit{effi}}$.

According to an embodiment, the terminal device i can determine the received signal strength $S_i$ of the terminal device i from the value in the ith column in the equivalent channel $H_{\textit{effi}}$, and car determine n interference value $I_j$ of the terminal device j to the terminal device i from the value in the jth column in the equivalent channel $H_{\textit{effi}}$, where $1 \le j \le K$ and $j \ne i$.

It should be understood that, the above mathematical expressions are only examples given for ease of description rather than restrictions, ad other ways can be adopted to describe the embodiment of FIG. 3.

For the sake of simplicity, a example in which each of the K candidate terminal devices is equipped with one receiving antenna is described above. It should be understood that, a similar processing mode is adopted in case where the terminal device has multiple receiving antennas. Therefore, in case where the K candidate terminal devices comprise terminal devices each equipped with one receiving antenna and terminal devices each equipped with multiple receiving antennas, the base station can also obtain the information indicating the interference from the K candidate terminal devices in the way shown in FIG. 3, thereby performing the MU-MIMO scheduling. The MU-MIMO scheduling will be described in detail in the following with reference to FIG. 7.

As can be learned from the above description, unlike the MU-MIMO scheduling in the prior art as shown in FIG. 2, in the MU-MIMO scheduling according to an embodiment of this disclosure as shown in FIG. 3, since the information fed back to the base station by each terminal device may include the information indicating the interference of other terminal devices to the terminal device, the base station can take into account the information indicating the interference fed back by each terminal device to perform accurate MU-MIMO scheduling.

An electronic device and its communication method used in a first terminal device side of a wireless communication system according to an embodiment of this disclosure will be described in the following with reference to FIG. 4 and FIG. 5. The first terminal device can for example correspond to any of the K candidate terminal devices shown in FIG. 3.

Figure 4:
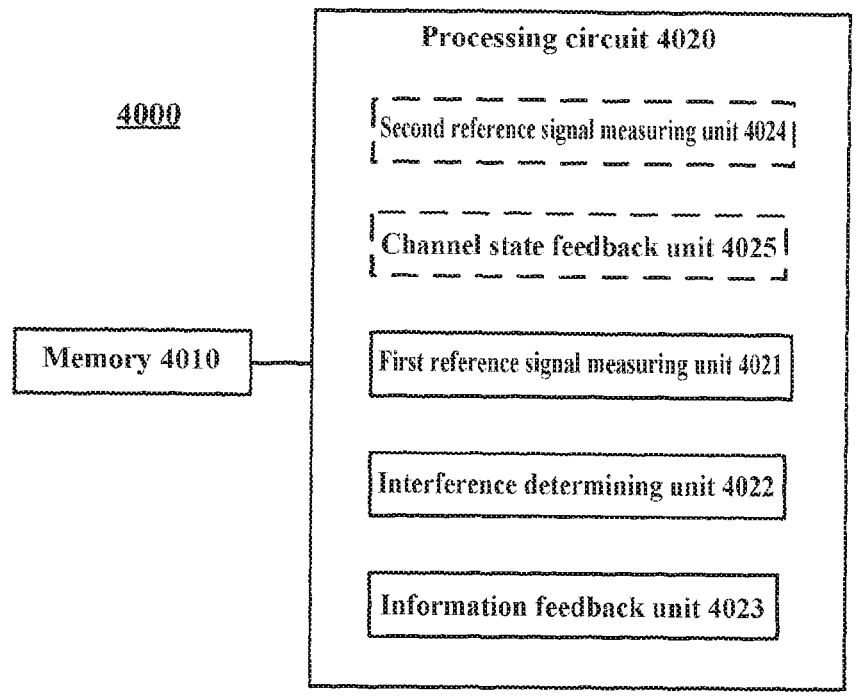
FIG. 4 is a block diagram showing a functional configuration of an electronic device used in a first terminal device side of a wireless communication system according to an embodiment of this disclosure.

FIG. 4 is a block diagram showing a functional configuration of an electronic device 4000 used in a first terminal device side of a wireless communication system according to an embodiment of this disclosure. In a embodiment, the electronic device 4000 can include, for example, a memory 4010 and a processing circuit 4020.

The memory 4010 of the electronic device 4000 can store information generated by the processing circuit 4020 and programs and data used for operating by the electronic device 4000. The memory 4010 can be a volatile memory and/or a non-volatile memory. For example, the memory 4010 can include, but is not limited to, a random access memory (RAM), a dynamic random access memory (DRAM), a static random access memory (SRAM), a read-only memory (ROM), and a flash memory.

The processing circuit 4020 of the electronic device 4000 provides various functions of the electronic device 4000. In an embodiment of this disclosure, the processing circuit 4020 of the electronic device 4000 may include a first reference signal measuring unit 4021, an interference determining unit 4022 and an information feedback unit 4023, which are respectively configured to perform steps S5000, S5002, S5004 in the communication method of the electronic device used in the first terminal device side of the wireless communication system, as shown in FIG. 5 below.

Figure 5:
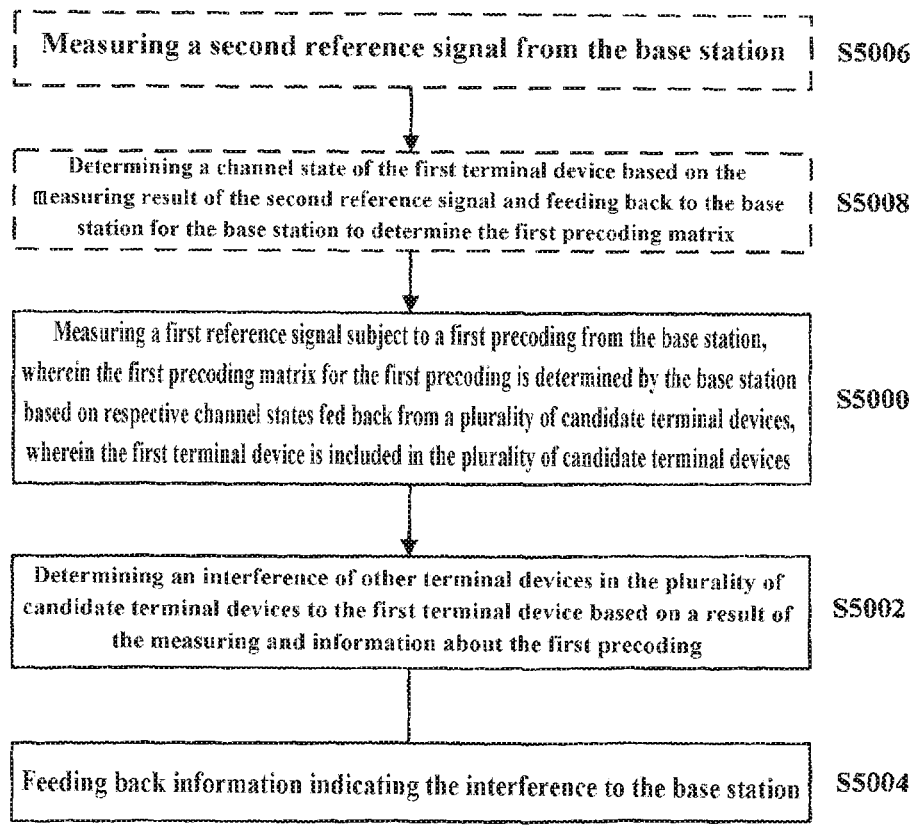
FIG. 5 is a flowchart showing a communication method used in a first terminal device side of a wireless communication system according to an embodiment of this disclosure.

According to an embodiment of this disclosure, the processing circuit 4020 may further include a second reference signal measuring unit 4024 and a channel state feedback unit 4025, which are respectively configured to perform steps S5006 and S5008 in the communication method of the electronic device used in the first terminal device side of the wireless communication system, as shown in FIG. 5 below.

The processing circuit 4020 can refer to various implementations of digital circuit systems, analog circuit systems or mixed signal (a combination of analog and digital) circuit systems that perform functions in a computing system. Processing elements may include, for example, circuits such as integrated circuits (IC), dedicated integrated circuits (ASIC), a part or circuit of an individual processor core, entire processor core, separate processors, programmable hardware devices such as field programmable gate arrays (FPGAs), and/or a system that includes multiple processors.

In addition, the electronic device 4000 can be achieved at a chip level, or can be achieved at a device level by including other external components. In an embodiment, the electronic device 4000 can be implemented as a whole machine as the first terminal device, and can also include one or more antennas.

It should be understood that, each of these units is merely a logical function module divided based on a specific function it performs, and is not intended to limit a specific implementation. In practical implementations, each of these functional units can be implemented as a separate physical entity, or can be implemented by a single entity (for example, processor (CPU or DSP, etc.), integrated circuit, etc.).

FIG. 5 is a flowchart showing a communication method used in a first terminal device side of a wireless communication system according to an embodiment of this disclosure. This communication method for example can be used for the electronic device 4000 as shown in FIG. 4.

As shown in FIG. 5, in a step S5000, the first reference signal subject to first precoding from the base station is measured, wherein the first precoding matrix for the first precoding is determined by the base station based on respective channel states fed back from a plurality of candidate terminal devices, wherein the first terminal device is included in the plurality of candidate terminal devices. According to an embodiment of this disclosure, the first reference signal can, for example, correspond to the reference signal in the step S3002 of FIG. 3, while the first reference signal subject to first precoding can correspond to the PC-RS in FIG. 3. The step S5000 can, for example, correspond to the step S3006 in FIG. 3.

The first precoding matrix can be used for performing beamforming on the first reference signal sent to the plurality of candidate terminal devices. According to an embodiment of this disclosure, a criterion for determining the first precoding matrix can be: making the channel between the plurality of candidate terminal devices after the first precoding be least relevant. For example, a known algorithm such as a zero forcing algorithm can be used for determining the first precoding matrix.

In a step S5002, an interference of other terminal devices in the plurality of candidate terminal devices to the first terminal device is determined based on a result of the measuring and information about the first precoding. The step S5002 can, for example, correspond to the step S3008 in FIG. 3.

The information about the first precoding can be used to help in determining the interference of other terminal devices to the first terminal device. For example, the information about the first precoding can include the number of the candidate terminal devices, and information of a layer that the first terminal device occupies (representing a number of the layer on the time-frequency resource block that is used to transmit to the first terminal device, e.g., the number i of the terminal device i), and so on. As shown in [Formula 2] described with reference to FIG. 3, this information can be used to help in estimating the equivalent channel $H_{\mathit{effi}}$. Alternatively, the information about the first precoding can also include information of a layer that another candidate terminal device (for example, the number j of the terminal device j) different from the first terminal device (for example, terminal device i) occupies, to determine a value of interference of the terminal device j to the terminal device i. Alternatively, the information about the first precoding can further include a reference signal type indicator for indicating a type of the first reference signal. For example, in case where the CSI-RS serves as the first reference signal, the reference signal type indicator can indicate whether the first reference signal subject to the first precoding from the base station is used for measuring the interference between the plurality of candidate terminal devices or for acquiring the traditional CSI. The information about the first precoding can be sent by the base station to each terminal device, or can be default, preset, or estimated by the terminal device itself based on the measurement. This will be described in more detail later with reference to FIG. 8. In a step S5004,
the information indicating the interference is fed back to the base station. The step S5004 can, for example, correspond to the step S3010 in FIG. 3.

According to an embodiment of this disclosure, the first reference signal is received from the base station via the antenna of the electronic device 4000 shown in FIG. 4, and the information indicating the interference is sent to the base station via the antenna.

According to an embodiment of this disclosure, the information indicating the interference can include information that indicates interference of all other terminal devices in the plurality of candidate terminal devices to the first terminal device. For example, suppose that the first terminal device is the terminal device i. The terminal device i estimates the equivalent channel $H_{\mathit{effi}}$ according to [Formula 2], and feeds back to the base station the values in the K−1 columns other than the ith column in $H_{\mathit{effi}}$ or the quantified values as the information indicating the interference, and the base station can determine a combination of terminal devices to perform an actual MU-MIMO transmission, and a modulation and coding scheme of each terminal device in the combination of terminal devices, based on the information indicating the interference fed back from each candidate terminal device.

According to an embodiment of this disclosure, the information indicating the interference may include information indicating one or more terminal devices that the interference thereof to the first terminal device is less than a predetermined threshold in the plurality of candidate terminal devices, and the base station can determine a combination of terminal devices to perform an actual MU-MIMO transmission, based on the information indicating the interference fed back from each candidate terminal device.

For example, suppose the first terminal device is the terminal device i. The interference values less than the predetermined threshold that are solved from the equivalent channel $H_{\mathit{effi}}$ estimated according to [Formula 2] are an interference value $I_m$ of a terminal device m and an interference value $I_n$ of a terminal device n, respectively (1≤m≤K, 1≤n≤K), then the information m, n of the layers corresponding to the terminal device m and the terminal device n can be fed back to the base station in an order of the interference values from small to large or from large to small, as the information indicating the interference. The signaling overhead can be reduced because only the information of the corresponding layers is fed back but the specific interference values are not fed back.

In an embodiment, the predetermined threshold can be preset between the base station and the first terminal device. In another embodiment, the predetermined threshold can be pre-configured by the base station for the first terminal device. In addition, the predetermined threshold can vary depending on the channel condition.

According to an embodiment of this disclosure, the information indicating the interference may include information indicating one or more terminal devices that the interference thereof to the first terminal device is less than a predetermined threshold in the plurality of candidate terminal devices and the corresponding values of the interference, and the base station can determine a combination of terminal devices to perform an actual MU-MIMO transmission and a modulation and coding scheme of each terminal device in the combination of terminal devices, based on the information indicating the interference fed back from each candidate terminal device. For example, the information indicating the interference can include, in addition to the information m and n of the layers corresponding to the terminal device m and the terminal device n, the interference value $I_m$ and the interference value $I_n$, or a sum $I_m+I_n$ of the interference value $I_m$ and the interference value $I_n$.

According to an embodiment of this disclosure, the information indicating the interference may include information indicating one or more terminal devices that the interference thereof to the first terminal device is less than a predetermined threshold in the plurality of candidate terminal devices and information about a signal and interference to noise ratio (SINR) of the one or more terminal devices performing MIMO communication with the first terminal device, and the base station can determine a combination of terminal devices to perform an actual MU-MIMO transmission and a modulation and coding scheme of each terminal device in the combination of terminal devices, based on the information indicating the interference fed back from each candidate terminal device. For example, the SINR of the terminal devices m and n performing the MU-MIMO communication with the terminal device i can be solved based on the values $I_m$ and $I_n$ of the interference of the terminal devices m and n to the terminal device i and the received signal strength $S_i$ of the terminal device i. In an embodiment, the information about the SINR can be channel quality information, i.e., $CQI_{MU}$, which is derived by quantizing the SINR and reflects the interference of other terminal devices.

According to an embodiment of this disclosure, the information indicating the interference may include information indicating a predetermined number of terminal devices in the plurality of candidate terminal devices that the interferences thereof to the first terminal device are the least, and the base station can determine a combination of terminal devices to perform an actual MU-MIMO transmission based on the information indicating the interference fed back from each candidate terminal device. In an embodiment, the predetermined number can be preset between the base station and the first terminal device. In another embodiment, the predetermined number can be preconfigured by the base station for the first terminal device. In addition, the predetermined number can vary depending on the channel condition.

In an embodiment, the information indicating the interference can be presented by a bitmap. For example, suppose that the candidate terminal devices are [$UE_1$, $UE_2$, $UE_3$, $UE_4$], wherein $UE_1$ is the first terminal device, and suppose that the predetermined number is 2. When $UE_1$ determines that the two terminal devices that the interferences thereof to $UE_1$ are the least in the other candidate terminal devices are $UE_2$ and $UE_4$, $UE_1$ can feedback a bitmap 1101 to the base station. The bitmap 1101 indicates that the terminal devices recommended by $UE_1$ for the MU-MIMO scheduling are $UE_1$, $UE_2$, and $UE_4$. The signaling overhead can be reduced since only information of the corresponding UE is fed back but specific interference values are not fed back.

According to an embodiment of this disclosure, the information indicating the interference may include information indicating a predetermined number of terminal devices in the plurality of candidate terminal devices that the interferences thereof to the first terminal device are the least and the corresponding values of the interferences, and the base station can determine a combination of terminal devices to perform an actual MU-MIMO transmission and a modulation and coding scheme of each terminal device in the combination of terminal devices, based on the information indicating the interference fed back from each candidate terminal device. For example, the information indicating the interference can include, in addition to information indicating $UE_2$ and $UE_4$ that the interferences thereof to $UE_1$ are the least, an interference value $I_2$ and an interference value $I_4$ of $UE_2$ and $UE_4$ to $UE_1$, respectively, or a sum $I_2+I_4$ of the interference value $I_2$ and the interference value $I_4$.

According to an embodiment of this disclosure, the information indicating the interference may include information indicating a predetermined number of terminal devices in the plurality of candidate terminal devices that the interferences thereof to the first terminal device are the least and information on the signal and interference to noise ratio of the predetermined number of terminal devices for MU-MIMO communication with the first terminal device, and the base station can determine a combination of terminal devices to perform an actual MU-MIMO transmission and a modulation and coding scheme of each terminal device in the combination of terminal devices, based on the information indicating the interference fed back from each candidate terminal device. For example, as an alternative or addition to the interference values of $UE_2$ and UE, the signal and interference to noise ratio in the presence of the interferences of $UE_2$ and $UE_4$ to $UE_1$ can be fed back.

Return to refer to steps S5006 and S5008 in FIG. 5. According to an embodiment of this disclosure, alternatively, the communication method used in the first terminal device side of the wireless communication system can also include the steps S5006 and S5008.

In the step S5006, a second reference signal from the base station is measured. The second reference signal can be, for example, CSI-RS in the prior art. The step S5006 can correspond to the step S2002 in FIG. 2, which is a step of measuring the CSI-RS in the prior art and does not take into account the interference between different terminal devices in the same cell.

In the step S5008, a channel state of the first terminal device is determined based on the measuring result of the second reference signal and fed back to the base station for the base station to determine the first precoding matrix. The information that is fed back to the base station can be for example, the channel state information that is fed back in the step S2004 during the MU-MIMO scheduling in the prior art as shown in FIG. 2, that is, it can include RI, PMI, and $CQI_{SU}$.

As described above, in some known technical discussions, a two-level channel information feedback method is proposed to reduce the complexity of channel estimation and the CSI feedback overhead. In such a method, the terminal device can quantify the short-term CSI and feed it back to the base station. However, although the short-term CSI contains the interference caused by other terminal devices to the terminal device, it cannot indicate by which terminal devices the interference is caused, nor can it determine a specific interference value therefrom.

According to an embodiment of the present invention, the terminal device can determine the interference caused by other terminal devices in the K candidate terminal devices to it, and feedback to the base station the information indicating the interference, such as one or more of the information indicating the interference as illustrated above. As a result, the base station can more accurately grasp the interference to each terminal device, thereby performing more accurate MU-MIMO scheduling.

Next, an electronic device and its communication method used in a base station side of the wireless communication system according to an embodiment of this disclosure are described with reference to FIG. 6 and FIG. 7. The base station can for example correspond to the base station shown in FIG. 3.

Figure 6:
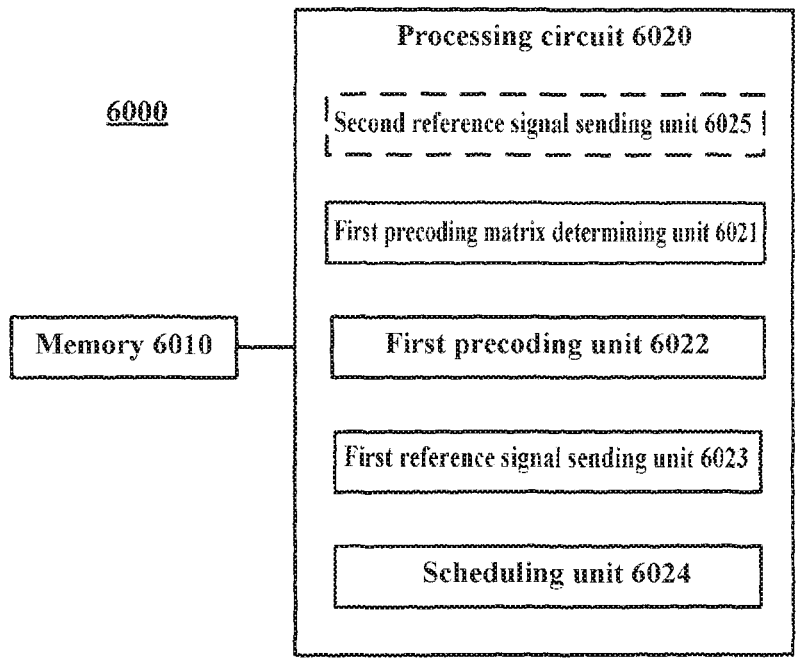
FIG. 6 is a block diagram showing a functional configuration of an electronic device used in a base station side of a wireless communication system according to an embodiment of this disclosure.

FIG. 6 is a block diagram showing a functional configuration of an electronic device 6000 used in the base station side of the wireless communication system according to an embodiment of this disclosure. In an embodiment, the electronic device 6000 can include, for example, a memory 6010 and a processing circuit 6020.

The memory 6010 of the electronic device 6000 can store information generated by the processing circuit 6020 and programs and data used for operating by the electronic device 6000. The memory 6010 can be a volatile memory and/or a non-volatile memory. For example, the memory 6010 can include, but is not limited to, a random access memory (RAM), a dynamic random access memory (DRAM), a static random access memory (SRAM), a read-only memory (ROM), and a flash memory.

The processing circuit 6020 of the electronic device 6000 provides various functions of the electronic device 6000. In an embodiment of this disclosure, the processing circuit 6020 of the electronic device 6000 may include a first precoding matrix determining unit 6021, a first precoding unit 6022, a first reference signal sending unit 6023 and a scheduling unit 6024, which are respectively configured to perform steps S7000, S7002, S7004 and S7006 in the communication method of the electronic device used in the base station side of the wireless communication system, as shown in FIG. 7 below.

Figure 7:
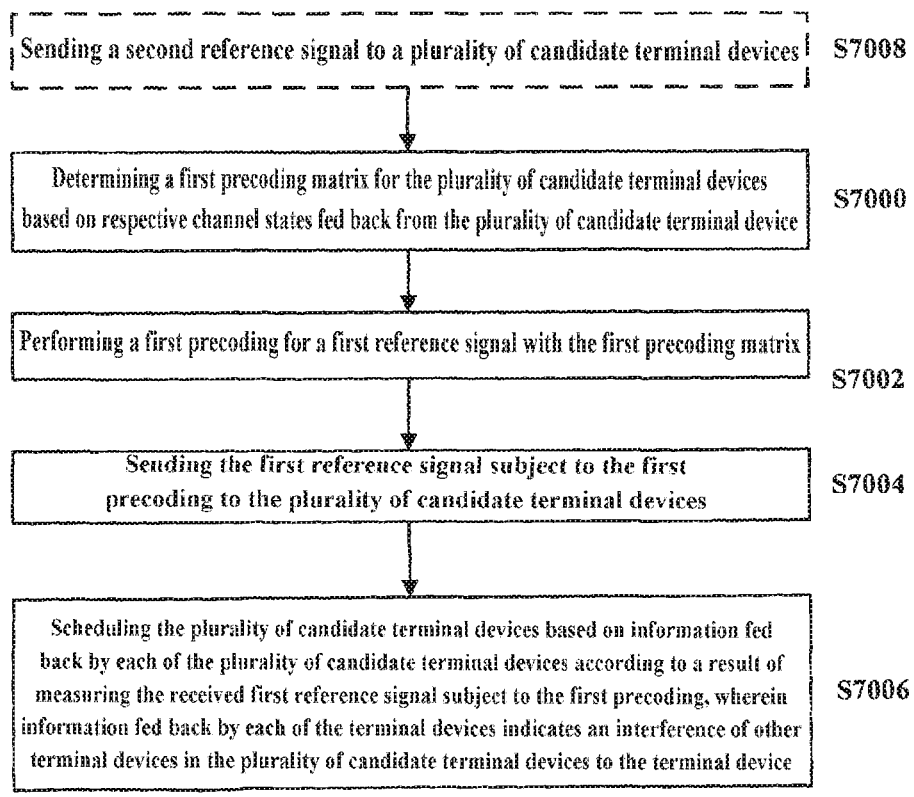
FIG. 7 is a flowchart showing a communication method used in a base station side of a wireless communication system according to an embodiment of this disclosure.

According to an embodiment of this disclosure, the processing circuit 6020 may further include a second reference signal sending unit 6025 configured to perform a step S7008 in the communication method of the electronic device used in the base station side of the wireless communication system, as shown in FIG. 7 below.

The processing circuit 6020 can refer to various implementations of digital circuit systems, analog circuit systems or mixed signal (a combination of analog and digital) circuit systems that perform functions in a computing system. Processing elements may include, for example, circuits such as integrated circuits (IC), dedicated integrated circuits (ASIC), a part or circuit of an individual processor core, entire processor core, separate processors, programmable hardware devices such as field programmable gate arrays (FPGAs), and/or a system that includes multiple processors.

In addition, the electronic device 6000 can be achieved at a chip level, or can be achieved at a device level by including other external components. For example, the electronic device 6000 can be implemented as a whole machine as the base station device, and can also include one or more antennas.

It should be understood that, each of these units is merely a logical function module divided based on a specific function it performs, and is not intended to limit a specific implementation. In practical implementations, each of these functional units can be implemented as a separate physical entity, or can be implemented by a single entity (for example, processor (CPU or DSP, etc.), integrated circuit, etc.).

FIG. 7 is a flowchart showing a communication method used in a base station side of a wireless communication system according to an embodiment of this disclosure. This communication method for example can be used for the electronic device 6000 as shown in FIG. 6.

As shown in FIG. 7, in a step 7000, a first precoding matrix for a plurality of candidate terminal devices is determined based on respective channel states fed back from the plurality of candidate terminal device. The Step S7000 can, for example, correspond to the step S3000 in FIG. 3.

The first precoding matrix can be used for performing beamforming on the first reference signal to be sent to the plurality of candidate terminal devices. According to an embodiment of this disclosure, a criterion for determining the first precoding matrix is: making the channel between the plurality of candidate terminal devices after the first precoding be least relevant. For example, a known algorithm such as a zero forcing algorithm can be used for determining the first precoding matrix.

In a step S7002, the first precoding for the first reference signal is performed with the first precoding matrix. According to an embodiment of this disclosure, the first reference signal can for example correspond to the reference signal in the step S3002 of FIG. 3, and the first reference signal subject to the first precoding can correspond to the PC-RS in FIG. 3. The step S7002 can, for example, correspond to the step S3002 in FIG. 3.

In a step S7004, the first reference signal subject to the first precoding is sent to the plurality of candidate terminal devices. The step S7004 can, for example, correspond to the step S3004 in FIG. 3.

In a step S7006, the plurality of candidate terminal devices is scheduled based on information fed back by each of the plurality of candidate terminal devices according to a result of measuring the received first reference signal subject to the first precoding and information about the first precoding, wherein the information fed back by each of the terminal devices indicates an interference of other terminal devices in the plurality of candidate terminal devices to the terminal device. The step S7006 can, for example, correspond to the step S3012 in FIG. 3. As described above with reference to FIG. 5, the information about the first precoding can include for example the number of the candidate terminal devices, and information of a layer that the first terminal device occupies (e.g., the number i of the terminal device i), and so on. As shown in [Formula 2] described with reference to FIG. 3, this information can be used to help in estimating the equivalent channel $H_{\mathit{eff}}$. Alternatively, the information about the first precoding can also include information of a layer that another candidate terminal device (for example, the number j of the terminal device j) different from the first terminal device (for example, terminal device i) occupies, to determine a value of interference of the terminal device j to the terminal device i. Alternatively, the information about the first precoding can further include a reference signal type indicator for indicating a type of the first reference signal, to determine whether the first reference signal subject to the first precoding from the base station is used for measuring the interference between the plurality of candidate terminal devices or for acquiring the traditional CSI. The information about the first precoding can be sent by the base station to each terminal device, or can be default, preset, or estimated by the terminal device itself based on the measurement. This will be described in more detail later with reference to FIG. 8.

In an embodiment, the plurality of candidate terminal devices are selected according to a condition of active terminal devices in a cell related to the base station. For example, if there exist M active terminal devices at the same time in the cell, the base station can select K terminal devices from among the M active terminal devices as the candidate terminal devices, where K≤M.

In an embodiment, that the base station schedules the plurality of candidate terminal devices can include: selecting one or more terminal devices to perform an actual MU-MIMO data transmission from among the plurality of candidate terminal devices. For example, the base station can select a combination of terminal devices with the best quality for the actual MU-MIMO data transmission from the plurality of candidate terminal devices, based on the information indicating the interference fed back from the plurality of candidate terminal devices.

In an embodiment, the base station can adjust the combination of terminal devices to perform the actual MU-MIMO data transmission based on the bitmap respectively fed back from each candidate terminal device, so that channels subject to a second precoding between the terminal devices in the combination of the selected terminal devices are least relevant, in order to reduce the interference between the terminal devices.

In an embodiment, that the base station schedules the plurality of candidate terminal devices can include: determining a second preceding matrix for the selected one or more terminal devices to perform the actual MU-MIMO transmission. For example, the base station can calculate the second preceding matrix for the actual MU-MIMO data transmission based on channel orientation information such as PMI/CRI for each terminal device in the combination of the selected terminal devices. The second precoding matrix is used for precoding the data to be transmitted.

In an embodiment, that the base station schedules the plurality of candidate terminal devices can include: allocating appropriate transmission resources (e.g., resource blocks and transmit power, etc.) for the selected one or more terminal devices.

In an embodiment, that the base station schedules the plurality of candidate terminal devices can include: determining modulation and coding schemes for the selected one or more terminal devices, for example, determining respective modulation schemes and data transmission rates for the selected one or more terminal devices.

Return to the step S7008 in FIG. 7. According to an embodiment of this disclosure, alternatively, the communication method used in the base station side of the wireless communication system can further include a step S7008.

In the step S7008, the second reference signal is sent to the plurality of candidate terminal devices. The plurality of candidate terminal devices feed back their respective channel states to the base station based on the result of measuring the received second reference signal. The second reference signal for example can be the CSI-RS in the prior art. The step S7008 can correspond to the steps S2000 in FIG. 2, i.e., the step of sending the CSI-RS in the prior art.

As mentioned above with reference to FIG. 5 and FIG. 7, each terminal device determines the interference of other terminal devices to the terminal device based on the result of measuring the first reference signal subject to the first precoding and the information about the first precoding.

In an embodiment, the base station can send the information about the first precoding to the candidate terminal devices, such as through downlink control information (DCI).

Figure 8:
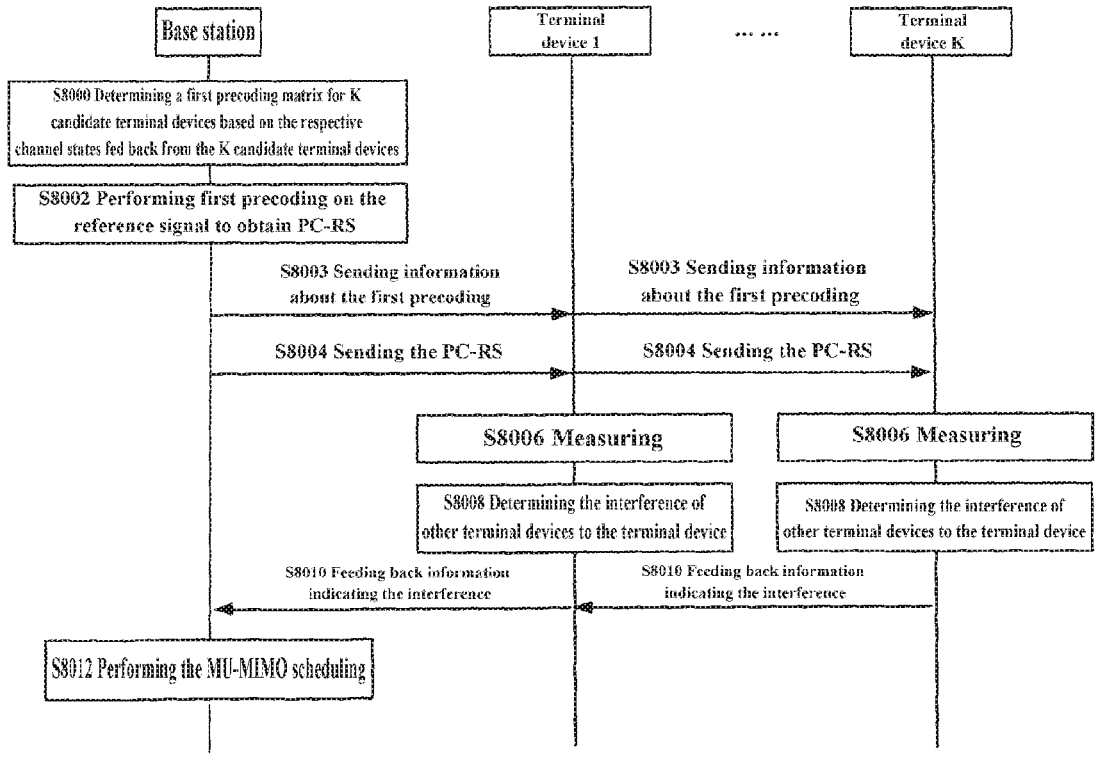
FIG. 8 is a signaling diagram showing MU-MIMO scheduling according to an embodiment of this disclosure.

FIG. 8 is a signaling diagram showing an example of the MU-MIMO scheduling according to an embodiment of this disclosure, wherein the base station sends the information about the first precoding to the candidate terminal devices, as shown in a step S8003. The other steps in FIG. 8 are identical with the corresponding steps in FIG. 3 and thus are omitted here.

In an embodiment, in a step S8003, the base station can send the number K of the candidate terminal devices and information of a layer that the terminal device 1 occupies to the terminal device 1, and send the number K of the candidate terminal devices and information of a layer that the terminal device K occupies to the terminal device K. In addition, in case where a resource element that carries the PC-RS on the resource block is uncertain, the base station can also send information about the resource element that carries the PC-RS to the candidate terminal devices to facilitate the terminal devices to perform measurements.

In an embodiment, in the step S8003, the base station can also send to the terminal devices a reference signal type indicator indicating a type of the reference signal. For example, in case where the base station sends the PC-CSI-RS to the K candidate terminal devices, the reference signal type indicator can be used to indicate whether the PC-CSI-RS is for measuring the interference between the plurality of candidate terminal devices or for acquiring the traditional CSI. For example, 1 bit of information can be added to the DCI on the downlink control channel as the reference signal type indicator, and the base station sends the DCI that includes the reference signal indicator to the plurality of candidate terminal devices. If the candidate terminal device receives the reference signal indicator of 0, it indicates that the observed PC-CSI-RS is used for acquiring the traditional CSI, and if the candidate terminal device receives the reference signal indicator of 1, it indicates that the observed PC-CSI-RS is used for measuring the interference between the plurality of terminal devices.

In an embodiment, the base station can add 1 bit of information to a CSI field in DCI format 0/4 as the reference signal type indicator. In another embodiment, the base station can use the existing CSI field in the current DCI format 0/4 to carry the reference signal type indicator. For example, in case where the terminal device is equipped with only one downlink cell, 2 bits are still used in the CSI request field, wherein the second bit acts as the reference signal type indicator. There is a common sense for such a rule between the base station and the terminal devices, so that each terminal device can smoothly read the reference signal type indicator from the CSI request field.

Unlike what is shown in FIG. 8, in another embodiment, one or more items in the information about the first precoding can be preset. For example, the number of the candidate terminal devices can be preset. In an embodiment, the base station selects a predetermined number of terminal devices as the candidate terminal devices and notifies the terminal devices in advance of the predetermined number. For example, the base station can configure the number of the candidate terminal devices in advance through semi-static configuration. In another embodiment, the number of the candidate terminal devices can be default or predetermined, without the need of notification from the base station. This can reduce DCI overhead.

In an embodiment, the information about the first precoding can be determined in the candidate terminal devices side without the need of sending or pre-configuring it by the base station. For example, a terminal device can identify a layer corresponding to the received signal with the largest power as the layer occupied by itself, and identify the other layers as the layers where the interfering terminal devices occupy. This can also reduce DCI overhead.

Next, occupancies of the first reference signal subject to the first precoding (e.g., PC-RS) and the second reference signal (e.g., CSI-RS) on the resource blocks according to an embodiment of this disclosure is described with reference to FIGS. 9A~9F, 10A~10B, 11A~11B, and 12A~12B.

FIGS. 9A~9F, 10A~10B, 11A~11B 12A~12B are schematic diagrams showing the occupancy of the reference signals on the resource blocks according to an embodiment of this disclosure. In the resource blocks shown in the above figures, resource elements C0~C3 respectively correspond to CRS ports 0~3, resource elements D7~D14 respectively correspond to DMRS port 7~14, and resource elements R15~R22 respectively correspond to CSI-RS ports 15~22, wherein resource elements shown with oblique shadow lines correspond to DCI regions, and resource elements shown with horizontal shadow lines correspond to other CSI-RS ports not used in the resource blocks.

According to an embodiment of this disclosure, the first reference signal subject to the first precoding is sent to each candidate terminal device by occupying a specific resource element on the resource block. In the above figures, the first reference signals subject to the first precoding are carried by the resource elements shown by "x".

In an embodiment, the first reference signal subject to the first precoding and the second reference signal can be carried by different resource elements.

Figure 9A:
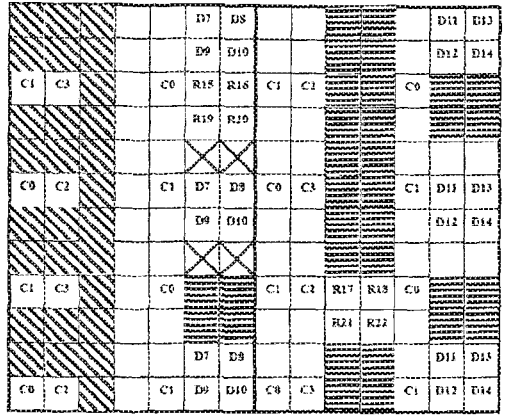
FIG. 9A-9F are schematic diagrams showing occupancies of reference signals on resource blocks according to an embodiment of this disclosure.
Figure 9B:
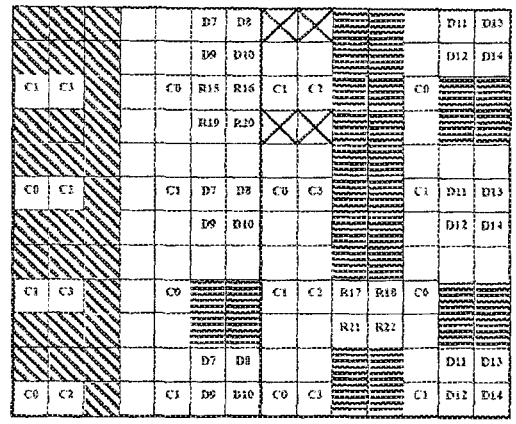
Figure 9C:
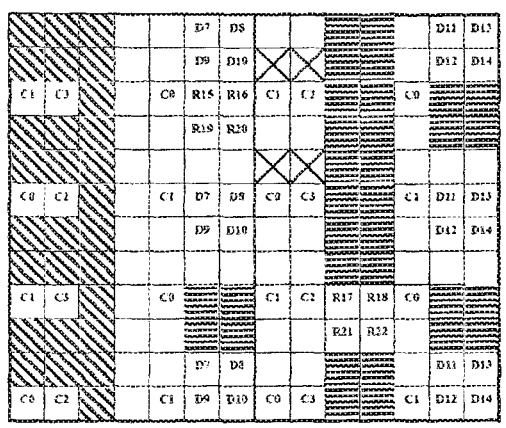
Figure 9D:
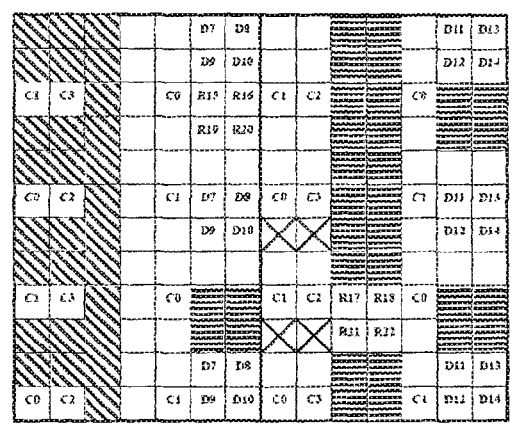
Figure 9E:
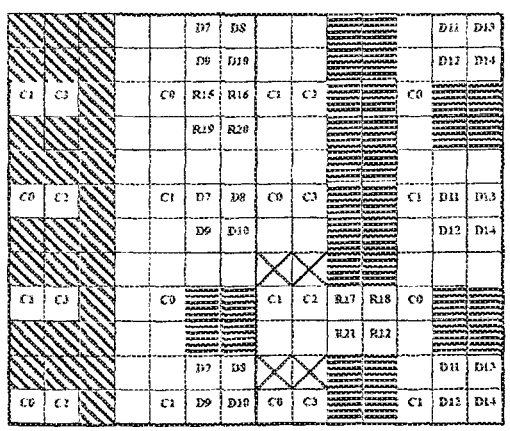
Figure 9F:
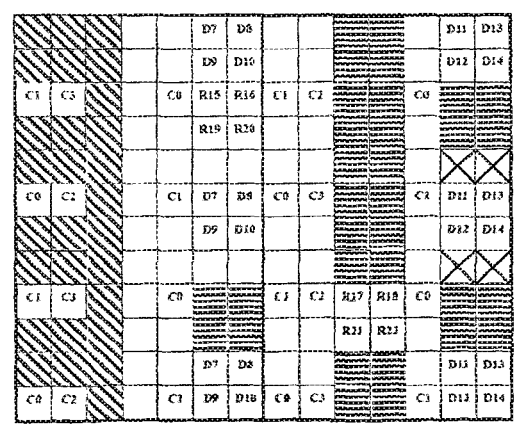

For example, FIG. 9A shows occupancies of the reference signals on the resource block in case where the number of the candidate terminal devices K=4. In FIG. 9A, the first reference signals subject to the first precoding are carried by 4 resource elements at the locations shown by "x" and sent to 4 candidate terminal devices respectively, while the second reference signals are carried by the resource elements R15~R22 (i.e., CSI-RS ports 15~22).

Alternatively, FIGS. 9B~9F show an example in which the first reference signals subject to the first precoding and the second reference signals are carried by different resource elements. FIGS. 9B~9F differ from FIG. 9A only in that the locations of the resource elements that carry the first reference signals subject to the first precoding are different.

In addition, the locations of the resource elements that carry the first reference signals subject to the first precoding, as shown in FIGS. 9A~9F, can be fixed by a communication protocol. As a result, the candidate terminal devices can measure the first reference signals subject to the first precoding from the base station, at the locations of the resource elements fixed by the communication protocol.

It should be understood that, the implementations of the first reference signals subject to the first precoding and the second reference signals carried by different resource elements according to this disclosure are not limited to what are shown in FIGS. 9A~9F. Those skilled in the art, under the teaching of this disclosure, could make similar designs according to the actual applications, for example, carrying the first reference signals subject to the first precoding by using the resource elements not occupied in the resource block.

In addition, FIGS. 9A~9F show the occupancies of the reference signals on the resource blocks in case where the number of the candidate terminal devices K=4. It should be understood that, those skilled in the art, under the teaching of this disclosure, could make similar designs for the cases where the number of the candidate terminal devices is other values.

In an embodiment, the first reference signal subject to the first precoding and the second reference signal can be carried by the same resource elements.

Figures 10A, 10B:
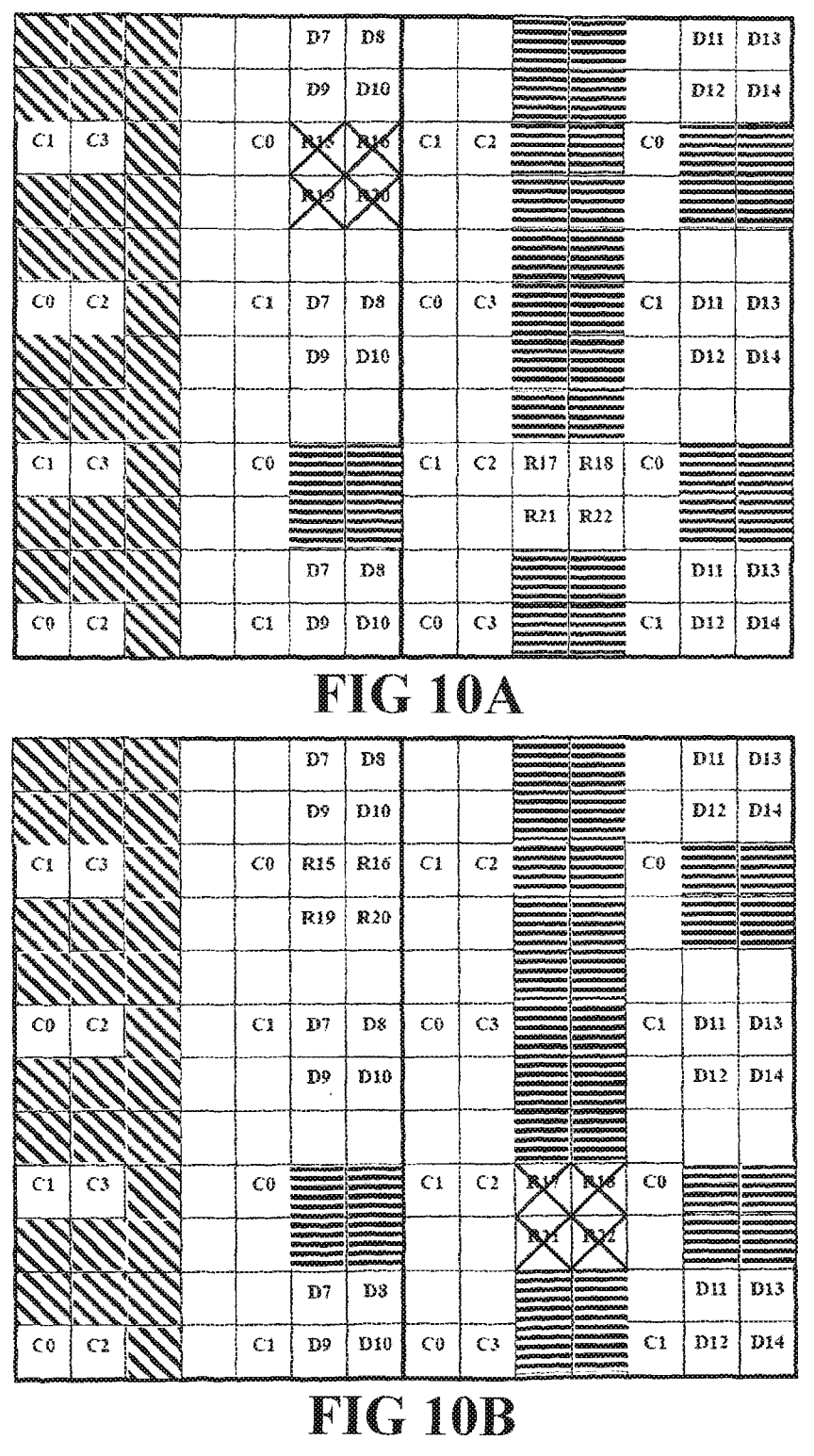

For example, FIGS. 10A and 10B show an example in which the resource elements R15~R22 (i.e., the CSI-RS ports 15~22) that carry the second reference signals are used to carry the first reference signals subject to the first precoding in case where the number of candidate terminal devices K=4. In FIG. 10A, the first reference signals subject to the first precoding and the second reference signals are carried by the resource elements R15, R16, R19, R20. In FIG. 10B, the first reference signals subject to the first precoding and the second reference signals are carried by the resource elements R17, R18, R21, R22.

In an embodiment, the second reference signal is transmitted periodically, and the first reference signal subject to the first precoding can be transmitted in a gap of the periodical transmission of the second reference signal.

Take FIG. 10A as an example for detail. In an embodiment, the base station periodically transmits the second reference signals to the terminal device through the resource elements R15, R16, R19, R20. When the MU-MIMO scheduling is required, the first reference signals subject to the first precoding can be transmitted by the base station in a gap of the periodical transmission of the second reference signals through the same resource elements R15, R16, R19, R20. In an embodiment, the transmission of the first reference signal subject to the first precoding can be triggered by the terminal device. In addition, when the MU-MIMO scheduling is not required, the base station can automatically terminate the transmission of the first reference signal subject to the first precoding, or the base station can be notified by the terminal device to terminate the transmission of the first reference signal subject to the first precoding.

By periodically transmitting the second reference signal and allowing the first reference signal subject to the first precoding to be transmitted in a gap between the periodical transmission of the second reference signal, the overhead of mapping design for the resource elements can be reduced, such that the first reference signal subject to the first precoding can be transmitted without changing the layout of the existing resource block.

In an embodiment, the reference signal type indicator described above can be used to notify the terminal device to measure the first reference signal subject to the first precoding. For example, if the candidate terminal device receives a reference signal indicator of 0, it indicates that the observed first reference signal subject to the first precoding is for acquiring the traditional CSI, and at this time the terminal device does not make multi-user interference measurement for the first reference signal subject to the first precoding; and if the candidate terminal device receives a reference signal indicator of 1, it indicates that the observed first reference signal subject to the first precoding is for measuring the interference between the plurality of terminal devices, and at this time the terminal device makes the multi-user interference measurement for the first reference signal subject to the first precoding. In an actual communication system, because the base station only performs the MU-MIMO scheduling when necessary, rather than performing the periodical MU-MIMO scheduling, as compared with the case where the terminal device periodically performs the multi-user interference measurement, signaling overhead can be saved by indicating whether the terminal device makes the multi-user interference measurement through the reference signal type indicator.

In addition, FIGS. 10A~10B show an example in which the first reference signals subject to the first precoding and the second reference signals occupy the same resource elements in case where the number of the candidate terminal devices K=4. It should be understood that, those skilled in the art, under the teaching of this disclosure, could make similar designs for the cases where the number of the candidate terminal devices is other values.

According to an embodiment of this disclosure, the first reference signals subject to the first precoding can be sent to the plurality of candidate terminal devices with occupying the same resource elements by way of code division multiple access.

In an embodiment, the first reference signals subject to the first precoding can be code division multiplexed through an orthogonal code matrix, so that the first reference signals subject to the first precoding are orthogonal to each other, thereby occupying the same time-frequency resources on the resource blocks. For ease of understanding, the above embodiments can be illustrated mathematically.

The first reference signals subject to the first precoding sent by way of code division multiple access can be expressed as:

$$y_i^T = H_i VCs + n_i \quad \text{[Formula 3]}$$

where $C = [c_1, \ldots c_i, \ldots, c_K]^T$ represents an K×N-dimensional orthogonal code matrix, $c_i$ represents an orthogonal code corresponding to the terminal device i and is a 1×N vector, N is a chip length of the orthogonal code, K orthogonal codes $c_1$ to $c_K$ are orthogonal to each other; $n_i$ represents the received noise at the terminal device i and is a 1×N vector. Other symbols in [Formula 3] are defined similarly to [Formula 1].

The terminal device i uses the orthogonal code matrix C to process the received signal, to obtain $$Cy_i = CC^T H_{\mathit{eff}}^T s + Cn_i^T = H_{\mathit{eff}}^T s + Cn_i^T \quad \text{[Formula 4]}$$

where the orthogonal code matrix C has an attribute of $CC^T = I_K$, where $I_K$ is a k-order unit matrix.

The equivalent channel $H_{\mathit{eff}}$ can be estimated from [Formula 4]. For example, when the condition N≥K is satisfied, the equivalent channel can be estimated by a classical estimation method (e.g., least square method), which is not limited by the invention.

According to the estimated equivalent channel $H_{\mathit{eff}}$, the terminal device could determine the information indicating the interference in a manner similar to that described above with reference to [Formula 2].

It should be understood that, the above mathematical expressions are merely examples rather than limitations given for the convenience of description, and the above embodiment can be described in other ways.

Figure 11A:
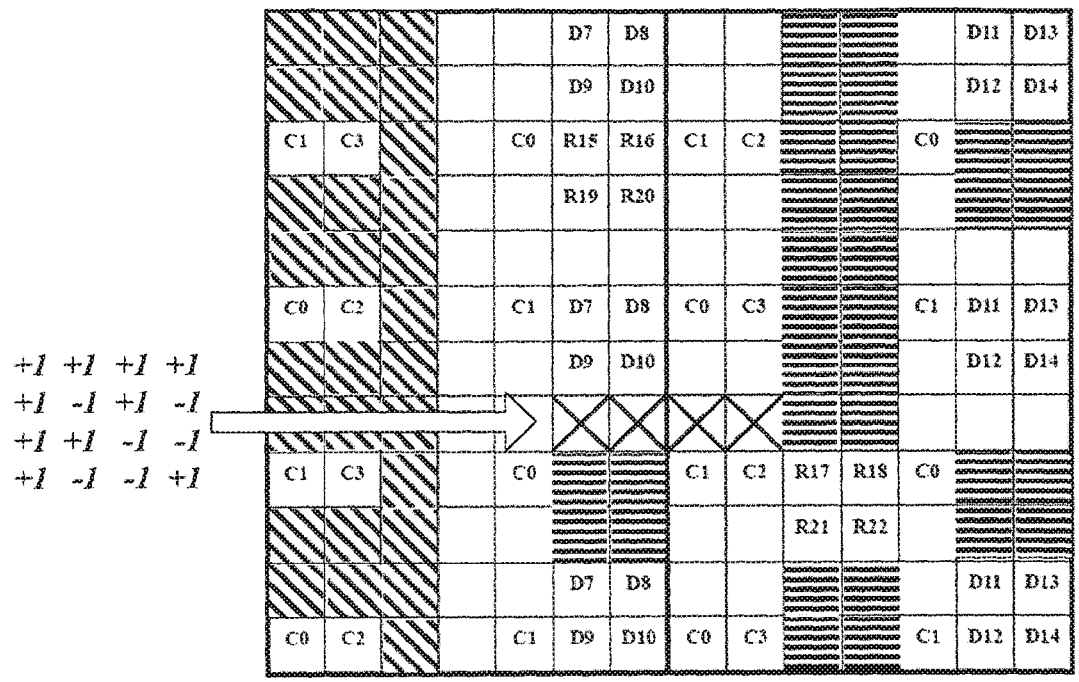
FIGS. 11A-11B are schematic diagrams showing occupancies of reference signals on resource blocks according to another embodiment of this disclosure.

FIG. 11A shows the resource occupancies of the first reference signals subject to the first precoding in case where the number of the candidate terminal devices K=4. In the following description, the PC-RSs are used to refer to the first reference signals subject to the first precoding.

In FIG. 11A, the orthogonal code matrix C with a chip length of N=4 is used to code division multiplex the PC-RSs sent to the K=4 candidate terminal devices. The orthogonal code matrix C is represented as follows, wherein each row in the orthogonal code matrix C is used for one candidate terminal device, and the orthogonal codes in each row are orthogonal to each other.

$$C = \begin{bmatrix} +1, & +1, & +1, & +1 \\ +1, & -1, & +1, & -1 \\ +1, & +1, & -1, & -1 \\ +1, & -1, & -1, & +1 \end{bmatrix}$$

Since the code division multiplexed PC-RSs are orthogonal to each other, the PC-RSs sent to different candidate terminal devices can occupy the same four resource elements (as shown by "x" in FIG. 11A) on the resource block without interference. Such a code division multiple access is also known as a full-code division multiple access (Full CDM).

In the full-code division multiple access, since each PC-RS occupies multiple resource elements and is sent to the candidate terminal devices, as compared with the case where each PC-RS occupies one resource element as shown in FIGS. 9A–9F, the candidate terminal devices have a larger observation space and the statistical average effect is better, and thus the influence of noise to the received signal at the terminal device can be reduced.

Figure 11B:
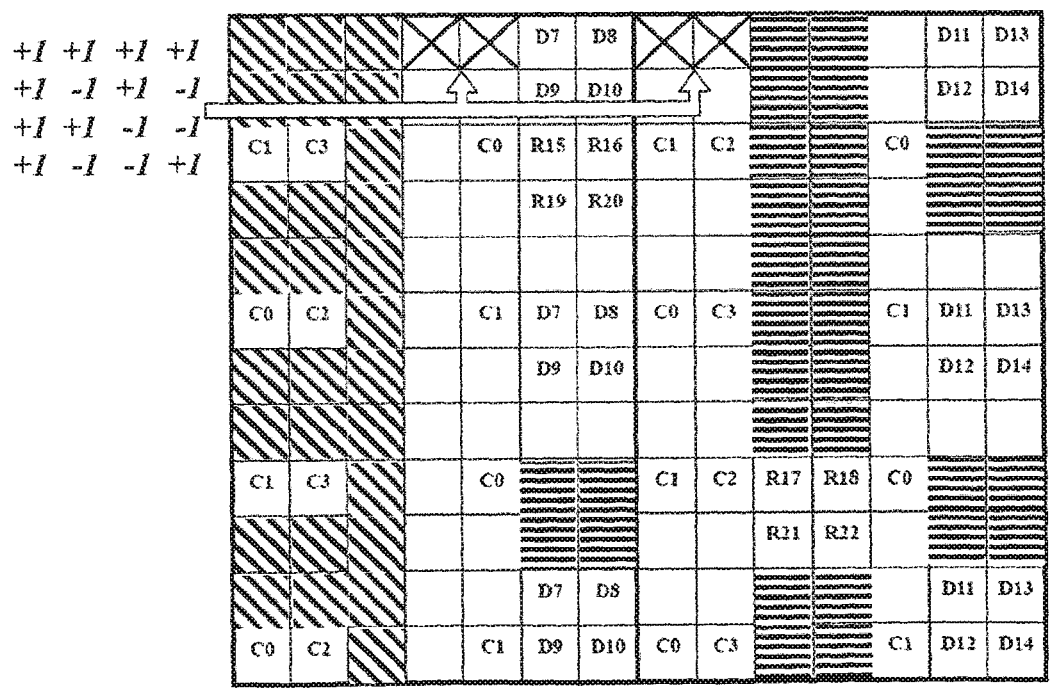

FIG. 11B shows the resource occupancies of the PC-RSs in another full-code division multiple access, which differs from FIG. 11A in that the locations of the resource elements occupied by the PC-RSs are different.

It should be understood that, the resource occupancies of the PC-RSs according to the full code division multiple access in this disclosure is not limited to what is shown in FIGS. 11A–11B. Those skilled in the art, under the teaching of this disclosure, could make similar designs according to actual applications, for example, carrying the PC-RSs in the full code division multiple access with the resource elements not occupied in the resource block.

In addition, although not illustrated, the first reference signals subject to the first precoding and the second reference signals according to the full code division multiple access in this disclosure can also be carried by the same resource elements.

In addition, FIGS. 11A–11B show the occupancies of the PC-RSs on the resource block in case where the number of the candidate terminal devices K=4. It should be understood that, those skilled in the art, under the teaching of this disclosure, could make similar designs for the cases where the number of the candidate terminal devices is other values.

According to an embodiment, the base station can send configuration information of the code division multiple access to the candidate terminal devices. The terminal device utilizes the configuration information of the code division multiple access acquired from the base station to process the measurement results, to determine the interference of other terminal devices to the terminal device. In an embodiment, the configuration information of the code division multiple access can include code word information of the orthogonal codes.

Figure 12A:
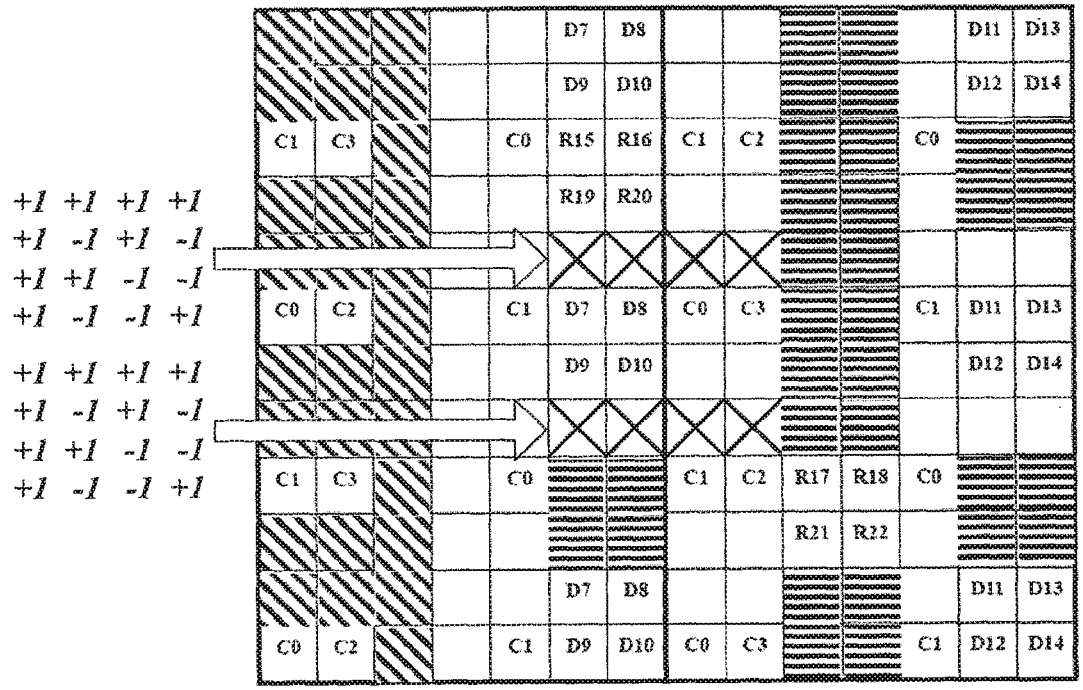
FIGS. 12A-12B are schematic diagrams showing occupancies of reference signals on resource blocks according to another embodiment of this disclosure.
Figure 12B:
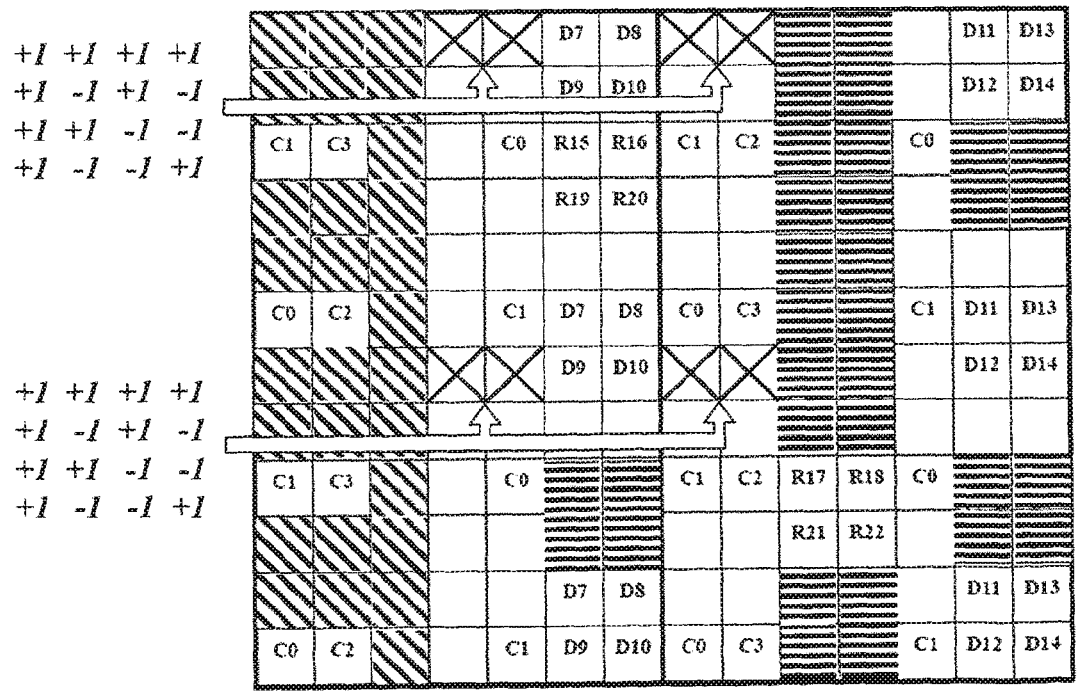

FIGS. 12A–12B are schematic diagrams showing the occupancies of the PC-RSs on the resource block according to another embodiment of this disclosure, wherein the number of the candidate user devices K=8.

As shown in FIG. 12A, in an embodiment, the candidate terminal devices are divided into two groups each comprising 4 candidate terminal devices. The 4 PC-RSs corresponding to the first group of candidate terminal devices are mapped to 4 resource elements on the resource block by way of the full-code division multiple access, and the 4 PC-RSs corresponding to the second group of candidate terminal devices are mapped to additional 4 resource elements on the resource block by way of the full-code division multiple access. Among them, two groups of orthogonal codes used for code division multiplexing can be the same as the orthogonal codes shown in FIGS. 11A–11B. Such a code division multiple access is called partial code division multiple access (Partial CDM).

FIG. 12B shows resource occupancies of the PC-RSs in another partial code division multiple access, which differs from FIG. 12A in that the locations of the resource elements occupied by PC-RSs are different.

It should be understood that, the resource occupancies of the PC-RSs according to the partial code division multiple access in this disclosure is not limited to what is shown in FIGS. 12A–12B. Those skilled in the art, under the teaching of this disclosure, could make similar designs according to actual applications, for example, carrying the PC-RSs in the partial code division multiple access by using the resource elements not occupied in the resource block.

In addition, although not illustrated, the first reference signal subjects to the first precoding and the second reference signals according to the partial code division multiple access in this disclosure can also be carried by the same resource elements.

In addition, FIGS. 12A~12B show the occupancies of the PC-RSs on the resource block in case where the number of the candidate terminal devices K=8. It should be understood that, those skilled in the art, under the teaching of this disclosure, could make similar designs for the cases where the number of the candidate terminal devices is other values.

Application examples according to this disclosure will be described below.

The technology in this disclosure can be applied to a variety of products.

For example, the base station can be implemented as any type of evolutionary node B (eNB), such as macro eNB and small eNB. The small eNB can be an eNB which covers a cell smaller than a macro cell, such as pico eNB, micro eNB, and home (femto) eNB. Alternatively, the base station 200 can be implemented as any other type of base station, such as NodeB and base transceiver station (BTS). The base station can include: a main body (also known as a base station device) configured to control wireless communication, and one or more remote radio headend (RRH) arranged in a different place from the main body. In addition, the various types of terminals described below can work as base stations by temporarily or semi-permanently executing functions of the base station.

For example, the terminal devices can be implemented as mobile terminals (such as smartphones, tablet personal computers (PCs), notebook PCs, portable game terminals, portable/encrypted dog mobile routers and digital camera devices) or vehicle terminals (such as vehicle navigation devices). The terminal devices can also be implemented as terminals that perform machine-to-machine (M2M) communication (also known as machine type communication (MTC) terminals). In addition, the terminal device can be a wireless communication module (such as an integrated circuit module that includes a single wafer) installed on each of the above terminals.

Application Examples for the Base Station

First Application Example

Figure 13:
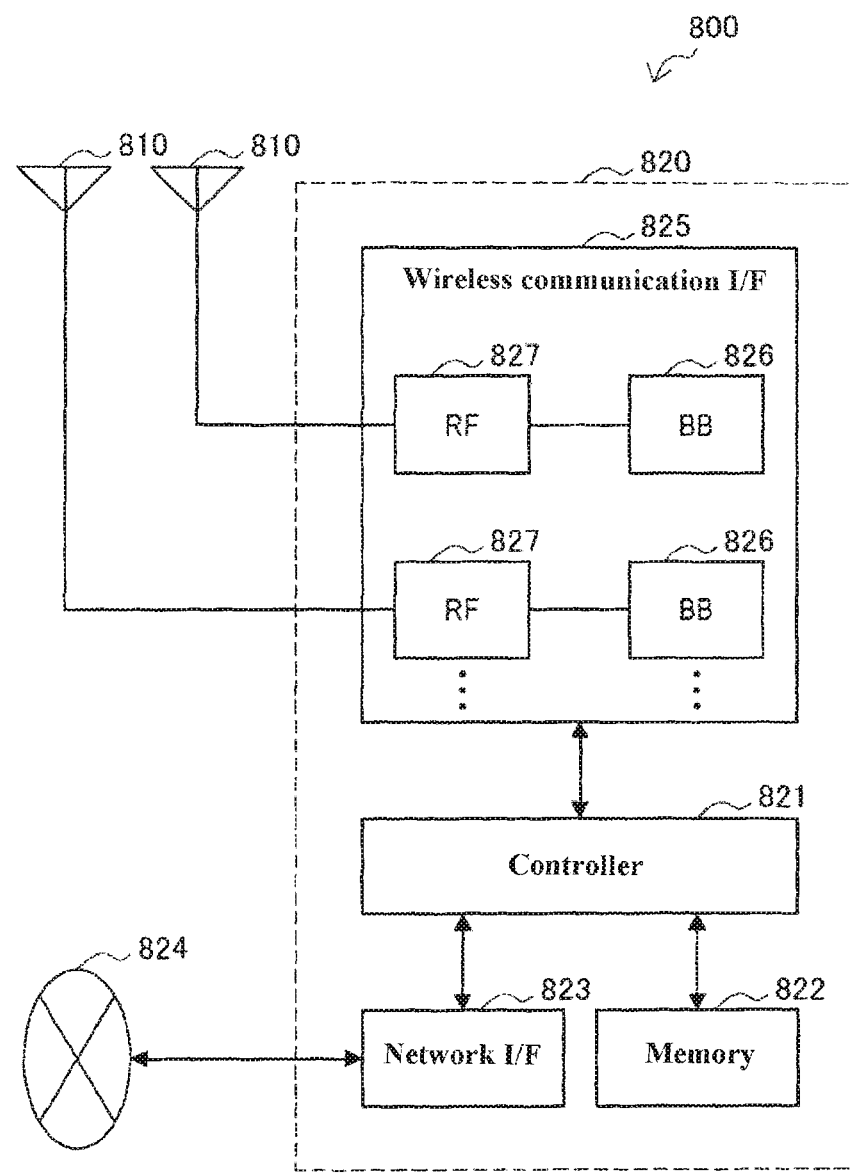
FIG. 13 is a block diagram showing a first example of an illustrative configuration of eNB according to an embodiment of this disclosure.

FIG. 13 is a block diagram showing a first example of an illustrative configuration of eNB that can apply the technology in this disclosure, eNB 800 includes one or more antennas 810 as well as a base station device 820. The base station device 820 and each antenna 810 can be connected to each other via a RF cable.

Each of the antennas 810 includes a single or multiple antenna elements (such as multiple antenna elements included in the multi-input multi-output (MIMO) antenna) and is used by the base station device 820 to transmit and receive wireless signals. As shown in FIG. 13, the eNB 800 can include multiple antennas 810. For example, the multiple antennas 810 can be compatible with multiple frequency bands used by the eNB 800. Although FIG. 13 shows an example in which the eNB 800 includes multiple antennas 810, the eNB 800 can also include a single antenna 810.

The base station device 820 includes a controller 821, a memory 822, a network interface 823 and a wireless communication interface 825.

The controller 821 can be for example a CPU or DSP, and operate various functions of the higher layers of the base station device 820. For example, the controller 821 generates data packets based on data in signals processed by the wireless communication interface 825, and delivers the generated packets via the network interface 823. The controller 821 can bundle the data from multiple baseband processors to generate bundled packets and deliver the generated bundled packets. The controller 821 can have the logical functionality to perform the following control: for example wireless resource control, wireless carrier control, mobility management, acceptance control, and scheduling. The control can be performed in conjunction with a nearby eNB or core network node. The memory 822 includes RAM and ROM, and stores programs executed by the controller 821 and various types of control data (such as terminal lists, transmission power data, and scheduling data).

The network interface 823 is a communication interface used to connect the base station device 820 to the core network 824. The controller 821 can communicate with the core network node or other eNBs via the network interface 823. In this case, the eNB 800 and the core network node or the other eNBs can be connected to each other through logical interfaces such as S1 interface and X2 interface. The network interface 823 can also be a wired communication interface or a wireless communication interface for wireless backhaul lines. If the network interface 823 is a wireless communication interface, the network interface 823 can use a higher frequency band for wireless communication than the frequency band used by the wireless communication interface 825.

The wireless communication interface 825 supports any cellular communication scheme (such as long-term evolution (LTE) and LTE-Advanced) and provides wireless connectivity to terminals located in a cell of the eNB 800 via the antenna 810. The wireless communication interface 825 typically can include, for example, a baseband (BB) processor 826 and a RF circuit 827. The BB processor 826 can perform for example encoding/decoding, modulation/demodulation, and multiplexing/demultiplexing, as well as various types of signal processing of layers (such as L1, media access control (MAC), wireless link control (RLC), and packet data convergence protocol (PDCP)). In place of the controller 821, the BB processor 826 can have some or all of the above logical functionalities. The BB Processor 826 can be a memory for storing communication control programs, or a module that includes processors and related circuits configured to execute the programs. Updating a program can change the functionality of the BB processor 826. The module can be a card or blade inserted into a slot of the base station device 820. Alternatively, the module can also be a chip mounted on the card or blade. At the same time, the RF circuit 827 can include, for example, mixers, filters, and amplifiers, and transmit and receive wireless signals via the antenna 810.

As shown in FIG. 13, the wireless communication interface 825 can include multiple BB processors 826. For example, the multiple BB processors 826 can be compatible with multiple frequency bands used by the eNB 800. As shown in FIG. 13, the wireless communication interface 825 can include multiple RF circuits 827. For example, the multiple RF circuits 827 can be compatible with multiple antenna elements. Although FIG. 13 shows an example in which the wireless communication interface 825 includes multiple BB processors 826 and multiple RF circuits 827, the wireless communication interface 825 can also include a single BB processor 826 or a single RF circuit 827.

Second Application Example

Figure 14:
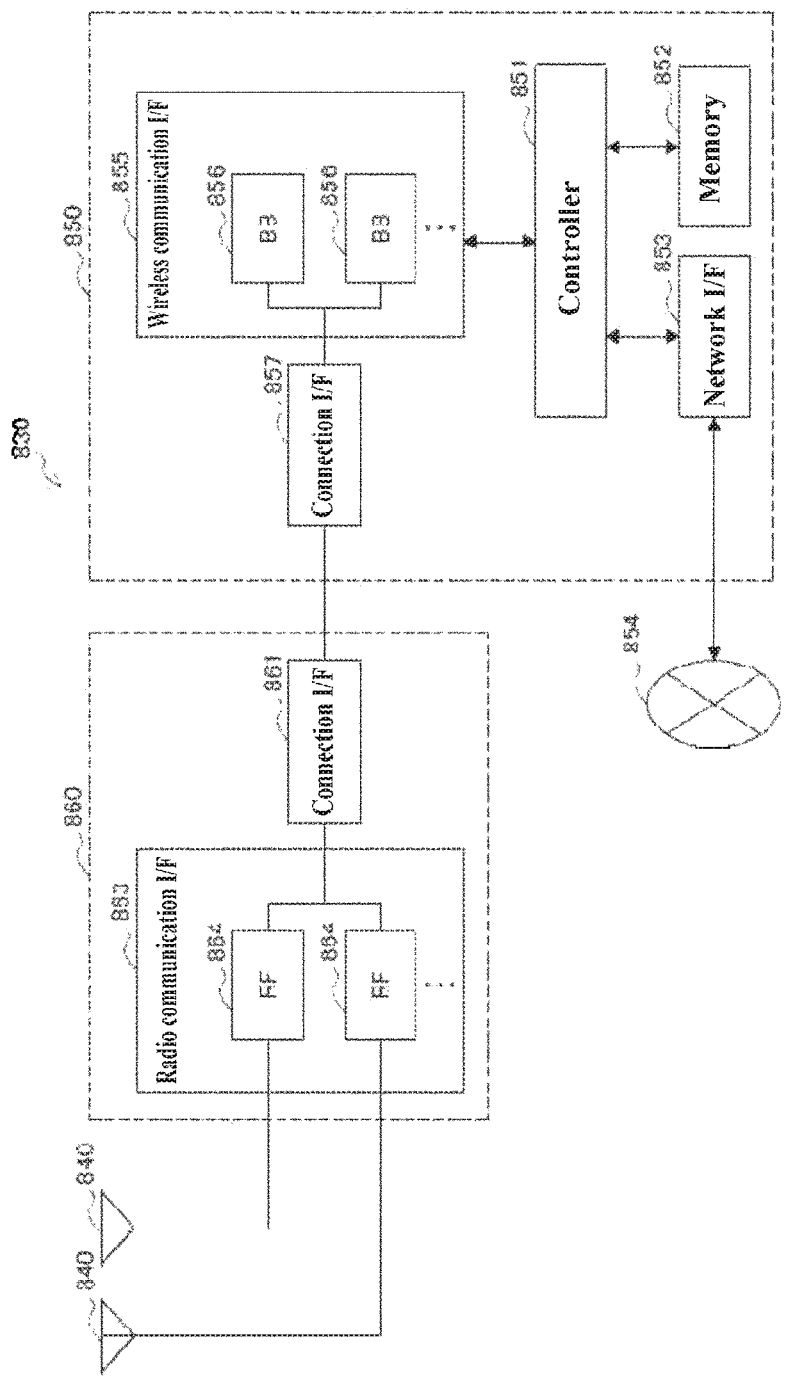
FIG. 14 is a block diagram showing a second example of an illustrative configuration of eNB according to an embodiment of this disclosure.

FIG. 14 is a block diagram showing a second example of the illustrative configuration of the eNB which can apply the technology in this disclosure. The eNB 830 includes one or more antennas 840, a base station device 850 and a RRH 860. The RRH 860 and each antenna 840 can be connected to each other via a RF cable. The base station device 850 and the RRH 860 can be connected to each other via high-speed lines such as optic fiber cables.

Each of the antennas 840 includes a single or multiple antenna elements (such as multiple antenna elements included in a MIMO antenna) and is used by the RRH 860 to transmit and receive wireless signals. As shown in FIG. 14, the eNB 830 can include multiple antennas 840. For example, the multiple antennas 840 can be compatible with multiple frequency bands used by the eNB 830. Although FIG. 14 shows an example in which the eNB 830 includes multiple antennas 840, the eNB 830 can also include a single antenna 840.

The base station device 850 includes a controller 851, a memory 852, a network interface 853, a wireless communication interface 855 and a connection interface 857. The controller 851, memory 852, and network interface 853 are the same as the controller 821, memory 822, and network interface 823 described with reference to FIG. 13.

The wireless communication interface 855 supports any cellular communication scheme (such as LTE and LTE-Advanced) and provides wireless communication to terminals located in sectors corresponding to the RRH 860 via the RRH 860 and the antenna 840. The wireless communication interface 855 typically can include, for example, a BB processor 856. Except that the BB processor 856 is connected to the RF circuit 864 of the RRH 860 via the connection interface 857, the BB processor 856 is the same as the BB processor 826 described with reference to FIG. 13. As shown in FIG. 14, the wireless communication interface 855 can include multiple BB processors 856. For example, the multiple BB processors 856 can be compatible with multiple frequency bands used by the eNB 830. Although FIG. 14 shows an example in which the wireless communication interface 855 includes multiple BB processors 856, the wireless communication interface 855 can also include a single BB processor 856.

The connection interface 857 is an interface used to connect the base station device 850 (wireless communication interface 855) to the RRH 860. The connection interface 857 can also be a communication module for communication in the above high-speed line, to connect the base station device 850 (wireless communication interface 855) to the RRH 860.

The RRH 860 includes a connection interface 861 and a wireless communication interface 863.

The connection interface 861 is an interface used to connect the RRH 860 (wireless communication interface 863) to the base station device 850. The connection interface 861 can also be a communication module for communication in the above high-speed lines.

The wireless communication interface 863 transmits and receives wireless signals via the antenna 840. The wireless communication interface 863 typically can include for example a RF circuit 864. The RF circuit 864 can include, for example, mixer(s), filter(s), and amplifier(s), and transmit and receive wireless signals via the antenna 840. As shown in FIG. 14, the wireless communication interface 863 can include multiple RF circuits 864. For example, the multiple RF circuit 864 can support multiple antenna elements. Although FIG. 14 shows an example in which the wireless communication interface 863 includes multiple RF circuit 864, the wireless communication interface 863 can also include a single RF circuit 864.

In the eNB 800 and the eNB 830 shown in FIG. 13 and FIG. 14, one or more components included in the processing circuit 6020 described with reference to FIG. 6 can be implemented in the wireless communication interface 912. Alternatively, at least a part of these components can also be implemented by the controller 821 and the controller 851.

Application Examples for Terminal Devices

First Application Example

Figure 15:
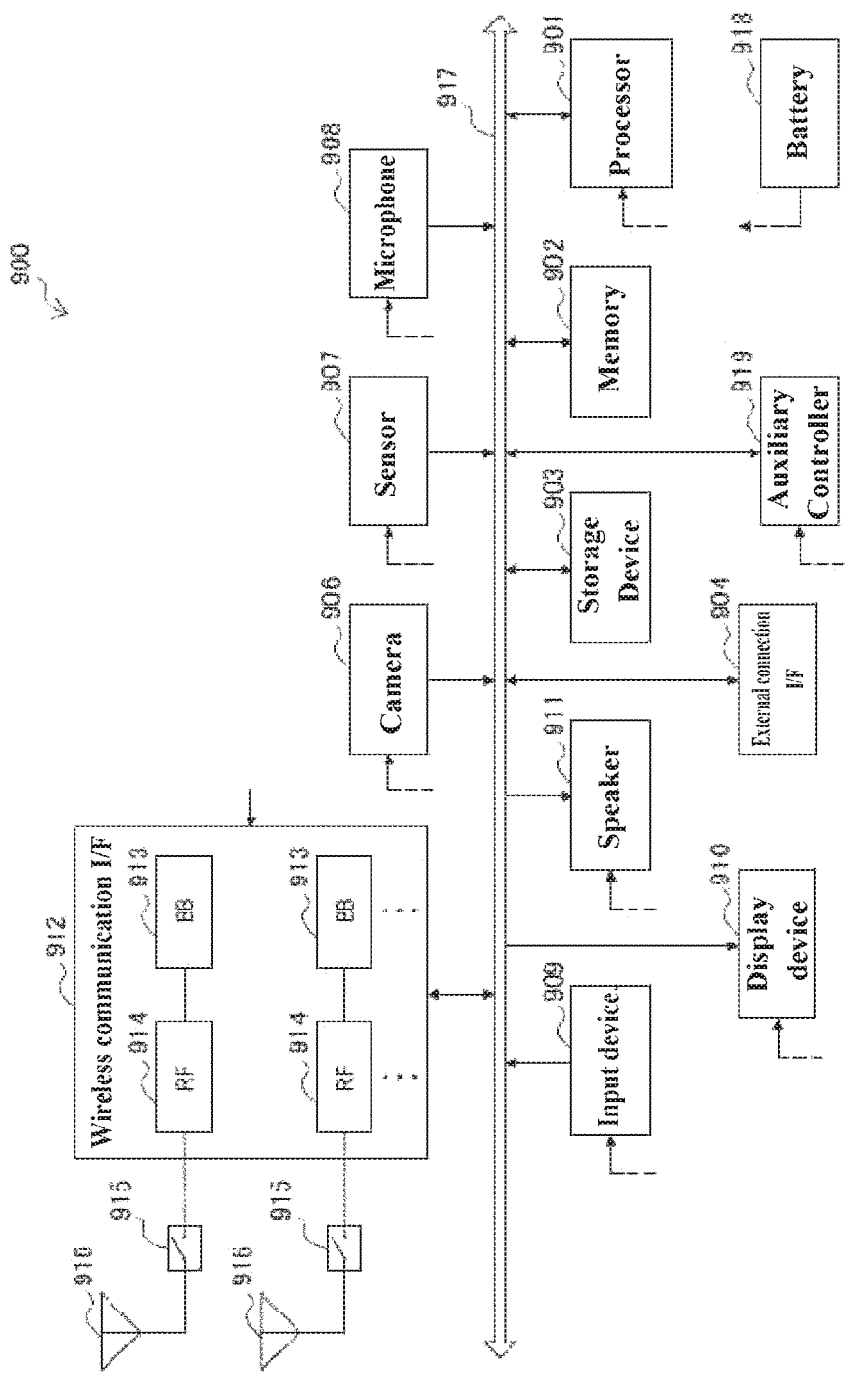
FIG. 15 is a block diagram showing an example of an illustrative configuration of a smart phone according to an embodiment of this disclosure.

FIG. 15 is a block diagram showing an example of an illustrative configuration of a smart phone 900 that can apply the technology in this disclosure. The smart phone 900 includes a processor 901, a memory 902, a storage device 903, an external connection interface 904, a camera device 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 can be, for example, a CPU or an on-chip system (SoC), and controls the functions of the application layer and other layers of the smart phone 900. The memory 902 includes RAM and ROM, and stores data and programs executed by the processor 901. The storage device 903 can include storage media, such as semiconductor memory and hard disks. The external connection interface 904 is an interface for connecting external devices such as memory cards and universal serial bus (USB) devices, to the smart phone 900.

The camera device 906 includes image sensors (such as charge-coupled devices (CCD) and complementary metal oxide semiconductors (CMOS)) and generates captured images. The sensor 907 can include a set of sensors, such as measurement sensor(s), gyroscope sensor(s), geomagnetic sensor(s), and acceleration sensor(s). The microphone 908 converts a sound inputted into the smart phone 900 into an audio signal. The input device 909 includes, for example, touch sensor, keypad, keyboard, buttons, or switches configured to detect a touch on the screen of the display device 910, and receives actions or information entered from the user. The display device 910 includes a screen (such as liquid crystal display (LCD) and organic light-emitting diode (OLED) display) and displays output images of the smart phone 900. The speaker 911 converts the audio signal outputted from the smart phone 900 into a sound.

The wireless communication interface 912 supports any cellular communication scheme (such as LTE and LTE-Advanced) and performs wireless communications. The wireless communication interface 912 typically can include, for example, a BB processor 913 and a RF circuit 914. The BB processor 913 can perform, for example, encoding/decoding, modulation/demodulation, and multiplexing/demultiplexing, and various types of signal processing for wireless communication. At the same time, the RF circuit 914 can include, for example, mixer(s), filter(s), and amplifier(s), and transmit and receive wireless signals via the antenna 916. The wireless communication interface 912 can be a chip module on which the BB processor 913 and the RF circuit 914 are integrated. As shown in FIG. 15, the wireless communication interface 912 can include multiple BB processors 913 and multiple RF circuits 914. Although FIG. 15 shows an example in which the wireless communication interface 912 includes multiple BB processors 913 and multiple RF circuits 914, the wireless communication interface 912 can also include a single BB processor 913 or a single RF circuit 914.

In addition, in addition to the cellular communication scheme, the wireless communication interface 912 can support other types of wireless communication schemes, such as short-range wireless communication scheme, near-field communication scheme and wireless local area network (LAN) scheme. In this case, the wireless communication interface 912 can include the BB processor 913 and the RF circuit 914 for each wireless communication scheme.

Each of the antenna switches 915 switches a connection destination of the antenna 916 between multiple circuits (e.g., circuits for different wireless communication schemes) included in the wireless communication interface 912.

Each of the antennas 916 includes a single or multiple antenna elements (such as multiple antenna elements included in the MIMO antenna) and is used by the wireless communication interface 912 to transmit and receive wireless signals. As shown in FIG. 15, the smart phone 900 can include multiple antennas 916. Although FIG. 15 shows an example in which the smart phone 900 includes multiple antennas 916, the smart phone 900 can also include a single antenna 916.

In addition, the smart phone 900 can include antennas 916 for each wireless communication scheme. In this case, the antenna switch 915 can be omitted from the configuration of the smart phone 900.

The bus 917 connects the processor 901, the memory 902, the storage device 903, the external connection interface 904, the camera device 906, the sensor 907, the microphone 908, the input device 909, the display device 910, the speaker 911, the wireless communication interface 912 and the auxiliary controller 919 to each other. The battery 918 provides power through the feeder to the respective blocks of the smart phone 900 shown in FIG. 15, wherein the feeder is partially shown in the figure as dotted lines. The auxiliary controller 919 for example operates minimum required functions of the smart phone 900 in a sleep mode.

In the smart phone 900 shown in FIG. 15, one or more components included in the processing circuit 4020 described with reference to FIG. 4 can be implemented in the wireless communication interface 912. Alternatively, at least a part of these components can also be implemented by the processor 901 or the secondary controller 919.

Second Application Example

Figure 16:
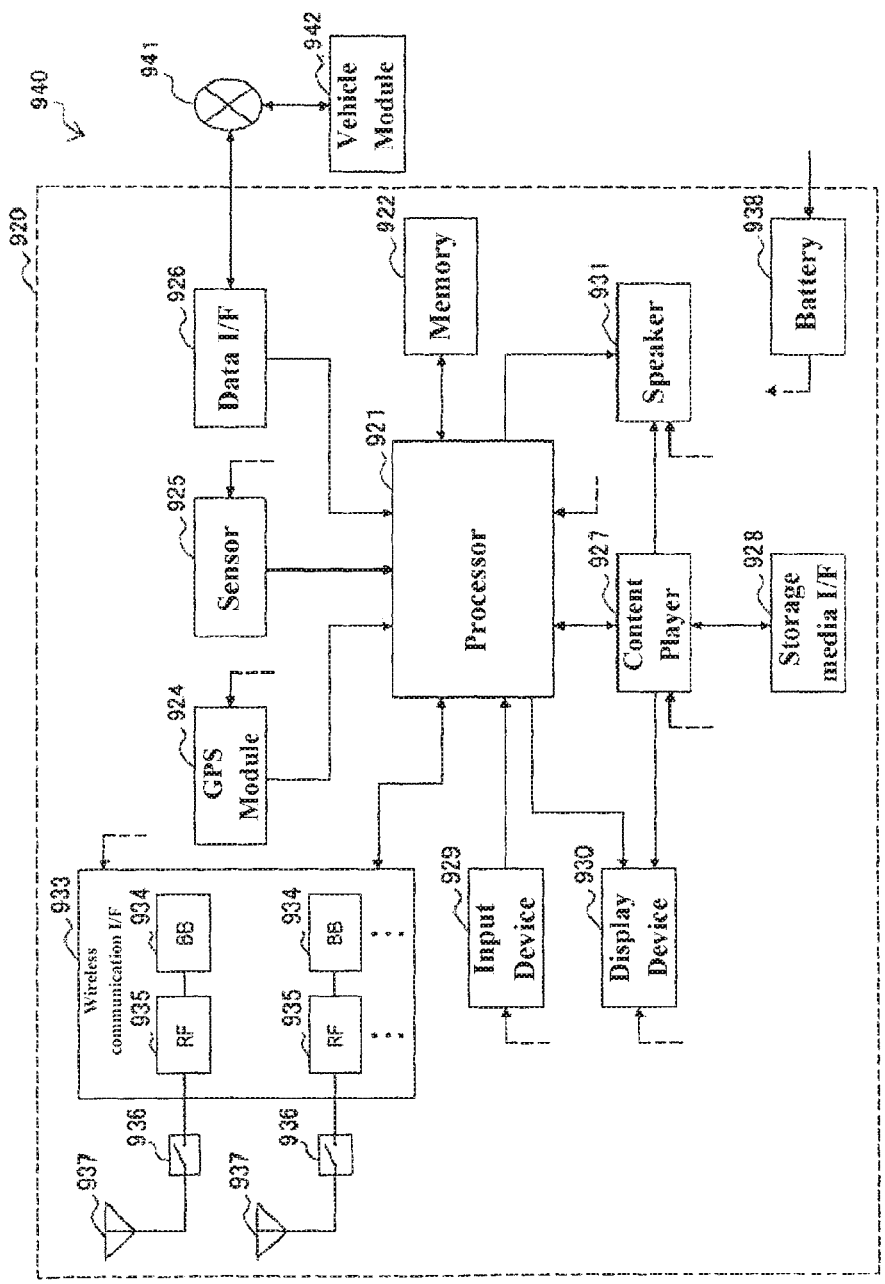
FIG. 16 is a block diagram showing an example of an illustrative configuration of a vehicle navigation device according to an embodiment of this disclosure.

FIG. 16 is a block diagram showing an example of an illustrative configuration of a vehicle navigation device 920 that can apply the technology in this disclosure. The vehicle navigation device 920 includes a processor 921, a memory 922, a global positioning system (GPS) module 924, a sensor 925, a data interface 926, a content player 927, a storage media interface 928, an input device 929, a display device 930, a speaker 931, a wireless communication interface 933, one or more antenna switches 936, one or more antennas 937, and a battery 938.

The processor 921 can be, for example, a CPU or SOC, and controls the navigation function and additional features of the vehicle navigation device 920. The memory 922 includes RAM and ROM, and stores data and programs executed by the processor 921.

The GPS module 924 uses GPS signals received from GPS satellites to measure the location (such as latitude, longitude, and height) of the vehicle navigation device 920. The sensor 925 can include a set of sensors, such as gyroscope sensor(s), geomagnetic sensor(s), and air pressure sensor(s). The data interface 926 is connected to, for example, a vehicle network 941 via a terminal not shown and acquires data generated by the vehicle (such as speed data).

The content player 927 plays back content stored in a storage medium such as CD and DVD, which is inserted into the storage medium interface 928. The input device 929 includes, for example, touch sensor(s), button(s), or switch (s) configured to detect a touch on the screen of the display device 930, and receives actions or information inputted from the user. The display device 930 includes a screen such as LCD or OLED display, and displays images of the navigation function or the played back content. The speaker 931 outputs the sound of the navigation function or the played back content.

The wireless communication interface 933 supports any cellular communication schemes (such as LTE and LTE-Advanced) and performs wireless communication. The wireless communication interface 933 typically can include, for example, a BB processor 934 and a RF circuit 935. The BB processor 934 can perform, for example, encoding/decoding, modulation/demodulation, and multiplexing/demultiplexing, and various types of signal processing for wireless communication. At the same time, the RF circuit 935 can include, for example, mixer(s), filter(s), and amplifier(s), and transmit and receive wireless signals via the antenna 937. The wireless communication interface 933 can also be a chip module on which the BB processor 934 and the RF circuit 935 are integrated. As shown in FIG. 16, the wireless communication interface 933 can include multiple BB processors 934 and multiple RF circuits 935. Although FIG. 16 shows an example in which the wireless communication interface 933 includes multiple BB processor 934 and multiple RF circuits 935, the wireless communication interface 933 can also include a single BB processor 934 or a single RF circuit 935.

In addition, in addition to the cellular communication scheme, the wireless communication interface 933 can support other types of wireless communication schemes, such as short-range wireless communication scheme, near-field communication scheme, and wireless LAN scheme. In this case, the wireless communication interface 933 can include the BB processor 934 and the RF circuit 935 for each wireless communication scheme.

Each of the antenna switches 936 switches a connection destination of the antenna 937 between multiple circuits (such as circuits for different wireless communication schemes) included in the wireless communication interface 933.

Each of the antennas 937 includes a single or multiple antenna elements (such as multiple antenna elements included in the MIMO antenna) and is used by the wireless communication interface 933 to transmit and receive wireless signals. As shown in FIG. 16, the vehicle navigation device 920 can include multiple antennas 937. Although FIG. 16 shows an example in which the vehicle navigation device 920 includes multiple antennas 937, the vehicle navigation device 920 can also include a single antenna 937.

In addition, the vehicle navigation device 920 can include an antenna 937 for each wireless communication scheme. In this case, the antenna switch 936 can be omitted from the configuration of the vehicle navigation device 920.

The battery 938 provides power through the feeder to the respective blocks of the vehicle navigation device 920 shown in FIG. 16, wherein the feeder is partially shown in the figure as dotted lines. The battery 938 accumulates the power provided from the vehicle.

In the vehicle navigation device 920 shown in FIG. 16, one or more components included in the processing circuit 4020 described with reference to FIG. 4 can be implemented in the wireless communication interface 912. Alternatively, at least a part of these components can also be implemented by processor 921.

The technology in this disclosure can also be implemented as a vehicle system (or vehicle) 940 that includes one or more blocks in the vehicle navigation device 920, the vehicle network 941, and the vehicle module 942. The vehicle module 942 generates vehicle data (such as vehicle speed, engine speed, and fault information) and outputs the generated data to the vehicle network 941.

It should be understood that, the reference to an "embodiment" or similar expressions in this specification means that specific features, structures, or characteristics described in the context of the embodiment are included in at least one specific embodiment of this disclosure. Therefore, in this specification, the appearance of terms such as "in the embodiment of this disclosure" and similar expressions does not necessarily refer to the same embodiment.

Those skilled in the art would appreciate that, this disclosure is implemented as a system, device, method or computer readable medium as a computer program product. Therefore, this disclosure can be implemented in various forms, such as complete hardware embodiments, complete software embodiments (including firmware, resident software, microprogram code, etc.), or can also be implemented in the form of software and hardware, which will be referred to as "circuit", "module" or "system" below. In addition, this disclosure can also be implemented as a computer program product in any tangible medium form, which has a computer usable program codes stored thereon.

This disclosure is described with reference to the flowcharts and/or block diagrams of the system, device, method and computer program product according to specific embodiments of this disclosure. It can be understood that, each block in each flowchart and/or block diagram, as well as any combination of blocks in the flowchart and/or block diagram, can be implemented using computer program instructions. These computer program instructions can be performed by a machine consisting of processors of a general computer or a special computer or other programmable data processing devices, and the instructions are processed by the computer or other programmable data processing devices to perform the functions or operations described in the flowcharts and/or block diagrams.

The drawings show the flowcharts and block diagrams of the structures, functions and operations that can be performed by the systems, devices, methods and computer program products according to various embodiments of this disclosure. Therefore, each block in the flowchart or block diagram can represent a module, a section, or partial program code that includes one or more executable instructions to implement the specified logical functionality. It should also be noted that, in some other embodiments, the functions described in the blocks can be performed not in the order shown in the figure. For example, two blocks connected in the figure can in fact be executed at the same time, or in some cases they can be executed in an opposite order of the reference signs depending on the functionality involved. It is also noted that blocks in each block diagram and/or flowchart, as well as a combination of blocks in the block diagram and/or flowchart, can be implemented through a dedicated hardware-based system or by a combination of dedicated hardware and computer instructions to perform specific functions or operations.

The embodiments of this disclosure have been described above, but they are exemplary not exhaustive, and are not limited to the various embodiments disclosed. Many modifications and variations are obvious to those skilled in the art without deviating from the scope and spirit of the embodiments described. The choice of the terms used in this disclosure is intended to best explain the principles, practical applications or technical improvements to the market technology of each embodiment, or to enable other skilled in the art to understand the embodiments disclosed herein.

What is claimed is:

1. An electronic device used in a first terminal device side of a wireless communication system including:
   a memory for storing computer instructions; and
   a processing circuit configured to perform the computer instructions stored thereon for:
   measuring a first reference signal subject to a first precoding from a base station, wherein a first precoding matrix for the first precoding is determined by the base station based on respective channel states fed back from a plurality of candidate terminal devices, wherein the first terminal device is included in the plurality of candidate terminal devices;
   determining an interference of other terminal devices in the plurality of candidate terminal devices to the first terminal device based on a result of the measuring and information about the first precoding; and
   feeding back information indicating the interference to the base stations wherein the first reference signal subject to the first precoding is sent to the plurality of candidate terminal devices occupying the same resource elements by way of code division multiple access.

2. The electronic device according to claim 1, wherein the processing circuit is further configured to perform the computer instructions stored thereon for
   measuring a second reference signal from the base station; and
   determining a channel state of the first terminal device based on the measuring result of the second reference signal and feeding back to the base station for the base station to determine the first precoding matrix.

3. The electronic device according to claim 2, wherein the first reference signal subject to the first preceding and the second reference signal are carried by different resource elements.

4. The electronic device according to claim 2, wherein the first reference signal subject to the first precoding and the second reference signal are carried by the same resource elements.

5. The electronic device according to claim 4, wherein the second reference signal is transmitted periodically, and the first reference signal subject to the first precoding is transmitted in a gap of the periodical transmission of the second reference signal.

6. The electronic device according to claim 1, wherein the information indicating the interference fed back to the base station includes one of
   information indicating one or more terminal devices that the interference thereof to the first terminal device is less than a predetermined threshold in the plurality of candidate terminal devices;
   information indicating one or more terminal devices that the interference thereof to the first terminal device is less than a predetermined threshold in the plurality of candidate terminal devices and the corresponding values of the interference;

information indicating one or more terminal devices that the interference thereof to the first terminal device is less than a predetermined threshold in the plurality of candidate terminal devices and information about a signal and interference to noise ratio of the one or more terminal devices performing multi-user MIMO communication with the first terminal device;

information indicating a predetermined number of terminal devices that the interferences thereof to the first terminal device are the least;

information indicating a predetermined number of terminal devices that the interferences thereof to the first terminal device are the least and the corresponding values of the interferences;

information indicating a predetermined number of terminal devices that the interferences thereof to the first terminal device are the least and information about a signal and interference to noise ratio of the predetermined number of terminal devices performing multi-user MIMO communication with the first terminal device.

7. The electronic device according to claim 1, wherein the information about the first precoding includes at least one of information of a number of the plurality of candidate terminal devices; information of a layer that the first terminal device occupies; information of a layer that each of the candidate terminal devices occupies; and information for indicating a type of the first reference signal.

8. The electronic device according to claim 1, wherein the processing circuit is further configured to perform the computer instructions stored thereon for
acquiring the information about the first precoding from the base station.

9. The electronic device according to claim 1, wherein the processing circuit is further configured to perform the computer instructions stored thereon for
acquiring configuration information of the code division multiple access from the base station; and
processing the result of the measuring using the configuration information of the code division multiple access corresponding to the first terminal device.

10. An electronic device used in a base station side of a wireless communication system including:
a memory for storing computer instructions; and
a processing circuit configured to perform the computer instructions stored thereon for:
determining a first precoding matrix for a plurality of candidate terminal devices based on respective channel states fed back from the plurality of candidate terminal device;
performing a first precoding for a first reference signal with the first precoding matrix;
sending the first reference signal subject to the first precoding to the plurality of candidate terminal devices occupying the same resource elements by way of code division multiple access; and
scheduling the plurality of candidate terminal devices based on information fed back by each of the plurality of candidate terminal devices according to a result of measuring the received first reference signal subject to the first precoding and information about the first precoding, wherein information fed back by each of the terminal devices indicates an interference of other terminal devices in the plurality of candidate terminal devices to the terminal device.

11. The electronic device according to claim 10, wherein the processing circuit is further configured to perform the computer instructions stored thereon for
sending a second reference signal to the plurality of candidate terminal devices,
wherein the plurality of candidate terminal devices feedback the respective channel states to the base station based on a result of measuring the received second reference signal.

12. The electronic device according to claim 11, wherein the first reference signal subject to the first precoding and the second reference signal are carried by the same resource elements, and
the second reference signal is transmitted periodically, and the first reference signal subject to the first precoding is transmitted in a gap of the periodical transmission of the second reference signal.

13. The electronic device according to claim 10, wherein the information about the first precoding includes at least one of information of a number of the plurality of candidate terminal devices; information of a layer that the first terminal device occupies, information of a layer that each of the candidate terminal devices occupies; and information for indicating a type of the first reference signal.

14. The electronic device according to claim 10, wherein the processing circuit is further configured to perform the computer instructions stored thereon for
sending the information about the first precoding to each of the plurality of candidate terminal devices.

15. The electronic device according to claim 10, wherein the processing circuit is further configured to perform the computer instructions stored thereon for
sending configuration information of the code division multiple access to each of the plurality of candidate terminal devices.

16. The electronic device according to claim 10, wherein scheduling the plurality of candidate terminal devices includes selecting one or more terminal devices to perform multi-user MIMO data transmission from the plurality of candidate terminal devices and includes at least one of determining a second precoding matrix for performing multi-user MIMO transmission for the selected one or more terminal devices; allocating transmission resources for the selected one or more terminal devices; and determining modulation and coding schemes for the selected one or more terminal devices.

17. A communication method for a wireless communication system including:
a first terminal device measures a first reference signal subject to a first precoding from a base station, wherein a first precoding matrix for the first precoding is determined by the base station based on respective channel states fed back from a plurality of candidate terminal devices, wherein the first terminal device is included in the plurality of candidate terminal devices;
the first terminal device determines an interference of other terminal devices in the plurality of candidate terminal devices to the first terminal device based on a result of the measuring and information about the first precoding;
the first terminal device feeds back information indicating the interference to the base station; and the base station sends the first reference signal subject to the first precoding to the plurality of terminal devices occupying the same resource elements by way of code division multiple access.

18. A communication method for a wireless communication system including:

a base station determines a first precoding matrix for a plurality of candidate terminal devices based on respective channel states fed back from the plurality of candidate terminal device;

the base station performs a first precoding for a first reference signal with the first precoding matrix;

the base station sends the first reference signal subject to the first precoding to the plurality of terminal devices occupying the same resource elements by way of code division multiple access; and the base station schedules the plurality of candidate terminal devices based on information fed back by each of the plurality of terminal devices according to a result of measuring the received first reference signal subject to the first precoding and information about the first precoding, wherein information fed back by each of the terminal devices indicates an interference of other terminal devices in the plurality of candidate terminal devices to the terminal device.

\* \* \* \* \*